United States Patent
Ochiai et al.

(10) Patent No.: US 6,485,384 B1
(45) Date of Patent: Nov. 26, 2002

(54) TOOTHED BELT, TOOTHED BELT POWER TRANSMISSION APPARATUS, AND BUSINESS EQUIPMENT EMPLOYING THE SAME

(75) Inventors: Masaki Ochiai, Hyogo (JP); Kyotaro Yanagi, Hyogo (JP); Hideaki Kawahara, Hyogo (JP); Ryuichi Kido, Hyogo (JP)

(73) Assignee: Bando Chemical Industries, Inc., Hyogo (JP)

( * ) Notice: Subject to any disclaimer, the term of this patent is extended or adjusted under 35 U.S.C. 154(b) by 0 days.

(21) Appl. No.: 09/673,259

(22) PCT Filed: Mar. 23, 2000

(86) PCT No.: PCT/JP00/01798

§ 371 (c)(1),
(2), (4) Date: Oct. 26, 2000

(87) PCT Pub. No.: WO00/58644

PCT Pub. Date: Oct. 5, 2000

(30) Foreign Application Priority Data

Mar. 25, 1999 (JP) ............................. 11-080936
May 10, 1999 (JP) ............................. 11-128707

(51) Int. Cl.$^7$ .............................. F16G 1/28; F16G 5/20
(52) U.S. Cl. ......................... 474/205; 474/204; 474/153
(58) Field of Search ................................ 474/205, 263, 474/260, 238, 250, 203–204, 265, 152–156, 160; 198/802.3

(56) References Cited

U.S. PATENT DOCUMENTS

| | | | | |
|---|---|---|---|---|
| 3,756,091 A | * | 9/1973 | Miller ........................ | 474/153 |
| 3,924,481 A | | 12/1975 | Gregg | |
| 3,931,882 A | * | 1/1976 | Ossbahr .................... | 198/803.2 |
| 4,233,852 A | * | 11/1980 | Bruns ........................ | 474/153 |
| 4,515,577 A | * | 5/1985 | Cathey et al. ............. | 474/153 |
| 4,604,080 A | * | 8/1986 | Mizuno ..................... | 474/153 |
| 4,878,886 A | * | 11/1989 | Kitabayashi et al. ....... | 474/153 |
| 4,915,674 A | * | 4/1990 | Tanaka et al. ............. | 474/153 |
| 5,102,374 A | * | 4/1992 | Macchiarulo et al. ...... | 474/153 |
| 5,405,299 A | | 4/1995 | Kubo et al. | |
| 5,536,213 A | * | 7/1996 | Macchiarulo et al. ...... | 474/205 |
| 5,624,337 A | | 4/1997 | Macchiarulo et al. | |

FOREIGN PATENT DOCUMENTS

| | | |
|---|---|---|
| DE | 3808518 A1 * | 2/1988 |
| DE | 3628329 A1 * | 9/1989 |
| EP | 106694 A1 | 4/1984 |
| EP | 368099 A1 | 5/1990 |
| JP | 141245 | 10/1981 |
| JP | 63-297838 A | 12/1988 |
| JP | 1-279135 | 11/1989 |
| JP | 3-94272 | 4/1991 |
| JP | 6-307522 A | 11/1994 |

* cited by examiner

Primary Examiner—David A. Bucci
Assistant Examiner—Marcus Charles
(74) Attorney, Agent, or Firm—Nixon Peabody LLP; Thomas W. Cole

(57) ABSTRACT

Disclosed is a belt tooth portion 11 of a toothed belt 8 incorporated in a toothed belt power transmission apparatus for use in equipment for business use. The belt tooth portion 11 comprises tooth root portions 12 formed of circularly arcuate surfaces which are arranged symmetrically with each other in respect to a centerline C2 in the tooth width direction, power transmission portions 13 formed of circularly arcuate surfaces of convex profile which contiguously adjoin the tooth root portions 12 and are arranged symmetrically with each other in respect to the tooth width direction centerline C2, tooth tip portions 14 formed of circularly arcuate surfaces which contiguously adjoin the power transmission portions 13 and are arranged symmetrically with each other in respect to the tooth width direction centerline C2, and a tooth crest surface 15 formed of an approximately flat surface which interconnects the tooth tip portions 14. The maximum pressure angle $\theta B$ at a connection point of the power transmission portion 13 and the tooth root portion 12 is set at from 15 degrees to 25 degrees. As a result of such arrangement, the nonuniformity of velocity of the toothed belt 8 is reduced as low as possible, thereby providing improvement in the printing accuracy and image quality of equipment for business use.

20 Claims, 17 Drawing Sheets

TOOTHED BELT, TOOTHED BELT POWER TRANSMISSION APPARATUS, AND BUSINESS EQUIPMENT EMPLOYING THE SAME

TECHNICAL FIELD

The present invention relates to a toothed belt, to a toothed belt power transmission apparatus, and to business equipment using such a toothed belt power transmission apparatus. The present invention belongs particularly to the technical field of reducing the nonuniformity of belt velocity, i.e., the variation in belt velocity.

BACKGROUND ART

Such a type of toothed belt has been known in the art. In the past, toothed belts having belt teeth of trapezoidal profile were used. However, for the achievement of higher power transmission and for the further reduction in noise, belts with a tooth profile having flank surfaces of convex profile have been proposed. Such a type of belt has now been used extensively nowadays. One of such tooth profiles is shown in Japanese Unexamined Patent Application Gazette No. S50-42252, which is known in the art as the STPD tooth profile. The other tooth profile is shown in Japanese Unexamined Patent Application Gazette No. S59-89852, which is known in the art as the HTD-II tooth profile. The former tooth profile, i.e., the STPD tooth profile, has been put to practical use (for example, SUPER TORQUE SYNCRO BELT, a product of BANDO CHEMICAL INDUSTRIES, LTD.). The latter tooth profile, i.e., the HTD-II tooth profile, has been also put to practical use (for example, POWER GRIP GT BELT, a product of UNITTA COMPANY). Further, Japanese Unexamined Patent Application Gazette No. S64-74341 shows and proposes a toothed belt for the purpose of accurate location drive of movable parts incorporated in a business machine. More specifically, as shown in FIG. 17, a plurality of belt tooth portions $11'$, $11''$, . . . (only one of which is shown in the figure) are provided along a land line LL of a main body $9'$ of a belt $8'$ at their fixed pitch. Each belt tooth portion $11'$ comprises tooth root portions $12'$ formed of circularly arcuate surfaces which are arranged symmetrically with each other in respect to a centerline C2 in the tooth width direction, power transmission portions $13'$, $13'$ formed of circularly arcuate surfaces of convex profile which contiguously adjoin the tooth root portions $12'$, $12'$ and are arranged symmetrically with each other in respect to the tooth width direction centerline C2, and tooth tip portions $14'$, $14'$ formed of circularly arcuate surfaces which contiguously adjoin the power transmission portions $13'$, $13'$ and are arranged symmetrically with each other in respect to the tooth width direction centerline C2, wherein these tooth tip portions $14'$, $14'$ are interconnected by a tooth crest surface $15'$ formed of a flat surface. When the toothed belt $8'$ is in static meshing engagement with a toothed pulley $1'$, the tooth root portion $12'$ of each of the belt tooth portions $11'$ substantially comes into contact with a tooth top arc portion $4'$ of a pulley tooth groove portion $3'$. The backlash of the belt tooth portion $11'$ at the pulley tooth groove portion $3'$ gradually increases from the tooth root portion to the tooth tip portion of the belt tooth portion $11'$ and the depth of the pulley tooth groove portion $3'$ exceeds the height of the belt tooth portion $11'$. In this prior art example, the backlash with the pulley tooth groove portion $3'$ is reduced to zero at the tooth root portion $12'$ of the belt tooth portion $11'$, while the backlash with the pulley tooth groove portion $3'$ is gradually increased from the tooth root portion to the tooth tip portion of the belt tooth portion $11'$ so that the belt tooth portion $11'$ tapers toward the tooth tip portion, thereby to suppress meshing interference between the belt tooth portion $11'$ and the tooth top arc portion $4'$ of the pulley tooth groove portion $3'$ for the reduction of belt pitch line variation due to such meshing interference. In FIG. 17, tooth groove flank surface portions of concave profile of the pulley tooth groove portion $3'$ are assigned the reference numeral $5'$, a tooth groove bottom portion is assigned the reference numeral $6'$, and the pitch line of the belt $8'$ is denoted by PL, which corresponds to the pitch circle of the pulley $1'$. Further, for the purpose of providing an easy understanding, in FIG. 17 the outer peripheral portion of the pulley $1'$ is shown in expanded fashion, together with the belt $8'$.

Apart from the above, in a typical business machine such as a printer and photocopier, a character printing (including printing of images) device making utilization of a toothed belt power transmission apparatus is used widely. In such a printer, a carriage carrying thereon an ink supply and a printing mechanism such as a hammer is attached to a toothed belt. The toothed belt is wound around toothed pulleys and the pulleys are forwarded and reversed to cause the carriage to reciprocate.

In order to enable the carriage to provide improved printing accuracy and image quality, it is required that the nonuniformity of velocity of the toothed belt when traveling over the pulleys (i.e., the belt velocity variation) be reduced as low as possible. Particularly, for the case of printers, there have been made rapid improvements in color printing, color printing speed-up, color printing quality. The meshing vibration (velocity nonuniformity caused by meshing) of toothed belt may cause printing nonuniformity and image nonuniformity, so that there have been strong demands for the reduction of the nonuniformity of belt velocity caused by meshing.

For the case of equipment for business use such as a printer, a toothed belt, such as an STPD toothed belt or HTD-II toothed belt, is commonly used, wherein the tooth pitch is set below 3 mm (for example, either 3 mm, 2 mm, or 1.5 mm), and the tooth has a profile which is just a scaledown of the tooth profile of relatively large tooth pitch such as 8-mm pitch or 5-mm pitch.

However, these tooth profiles were originally developed for use in high power transmission, in which no scheme to meet demands for the reduction of the nonuniformity of velocity was taken into consideration at all. Although the toothed belt of the foregoing prior art (S64-74341) was proposed taking into account the occurrence of belt velocity nonuniformity to some extent, it failed to provide a tooth profile optimum for the reduction of the nonuniformity of velocity. This prior art technique is therefore unable to reduce the nonuniformity of belt velocity to a sufficient extent.

In fact, little research in tooth profile has been done for the reduction of toothed belt velocity nonuniformity. Bearing in mind the above, the present invention was made by the inventor who intensively conducted analysis and experiments on various factors constituting a tooth profile of a toothed belt for use in equipment for business use or the like. Accordingly, an object of the present invention is to reduce the nonuniformity of toothed belt velocity as low as possible.

DISCLOSURE OF THE INVENTION

In order to achieve the above-described object, the inventor conducted research. The research result had shown that, for the case of toothed belts having tooth portions with convex flank surface portions, the flank maximum pressure angle had considerable influence on the nonuniformity of velocity. This factor had not at all been taken into consideration before. That is to say, in conventional toothed belts having either an STPD tooth profile or an HTD-II tooth profile for use in high power transmission applications, the maximum pressure angle of the tooth flank surface is set low for the avoidance of tooth jumping occurring during high power transmission operation. For example, for an STPD tooth profile whose tooth pitch is between 1.5 mm and 3.0 mm, the flank maximum pressure angle is set to fall in the range between an angle of 14.2 degrees and an angle of 14.4 degrees, while, for an HTD-II tooth profile whose tooth pitch between 1.5 mm and 3.0 mm, the flank maximum pressure angle is set to fall in the range between an angle of 7.5 degrees and an angle of 8.1 degrees. On the other hand, for the case of toothed belts that find applications in equipment for business use, they are driven under low power transmission conditions. Therefore, there is almost no need to take into account belt tooth jumping. The research result by the inventor shows that the nonuniformity of belt velocity can be reduced to a considerable extent if the flank maximum pressure angle is set to fall in the range between an angle of 15 degrees and an angle of 25 degrees.

As an embodiment of the above finding, the present invention provides a toothed belt which comprises a belt main body with a pitch line on which a tensile member is embedded therein and a plurality of belt tooth portions provided at a fixed pitch on a land line of the belt main body. Each of the belt tooth portions comprises tooth root portions formed of circularly arcuate surfaces which are arranged symmetrically with each other in respect to a centerline in the tooth width direction, power transmission portions formed of circularly arcuate surfaces of convex profile which contiguously adjoin the tooth root portions, lie at flank surfaces of the tooth portion, and are arranged symmetrically with each other in respect to the tooth width direction centerline, tooth tip portions formed of circularly arcuate surfaces which contiguously adjoin the power transmission portions and are arranged symmetrically with each other in respect to the tooth width direction centerline, and a tooth crest surface formed of an approximately flat surface which interconnects the tooth tip portions, wherein the maximum pressure angle at where the power transmission portion of the belt tooth flank surface and the tooth root portion are connected together is between an angle of 15 degrees and an angle of 25 degrees.

At the time when a tooth portion of the toothed belt comes into meshing engagement with a driving-side tooth groove portion of the toothed pulley, such engagement of the belt tooth portion with the pulley tooth groove portion takes place at a location which is somewhat delayed with respect to the location of the pulley tooth groove portion because of the influence of load torque that is applied. Consequently, an aft flank surface of the belt tooth portion in respect to the traveling direction is first brought into contact with a flank surface of the pulley tooth groove portion. Thereafter, the belt tooth portion slides into the pulley tooth groove portion. At this time, at a span of the belt (i.e., at a belt portion that is not being wound around the pulley), the belt pitch line moves vertically in a direction normal to the belt span, resulting in the occurrence of meshing velocity nonuniformity. The amount of vertical movement of the belt pitch line is determined by a reaction force produced when the belt tooth portion slides into the pulley tooth groove portion and a component of a belt tension force produced when the belt is pushed upward by the reaction force. Because of this, as the contact position moves away from the perfect meshing position of the belt tooth portion and the pulley tooth groove portion, the belt tension force component decreases, thereby increasing the amount of upward movement of the belt pitch line. In other words, earlier contacting of the belt tooth portion with the pulley tooth groove portion results in greater velocity nonuniformity. Therefore, if the maximum pressure angle is small as in the conventional tooth profiles, then the contacting of the belt tooth flank surface with the pulley tooth groove flank surface takes place early (see FIG. 4(b)). On the other hand, if the maximum pressure angle is set larger in comparison with the conventional techniques, this delays the contacting of the belt tooth flank surface with the pulley tooth groove flank surface (see FIG. 4(a)), thereby reducing the nonuniformity of belt velocity.

However, the maximum pressure angle cannot be increased excessively and if the maximum pressure angle is too great, this will not reduce the nonuniformity of velocity; rather the nonuniformity of velocity increases. That is to say, as described above, the amount of shift of the belt span is determined by reaction force (produced when the belt tooth portion slides into the pulley tooth groove portion after their flank surfaces come into contact with each other) and belt tension force component. However, at that time, if the maximum pressure angle is too great, then a component of a reaction force in the vertical direction (i.e., in the direction normal to the belt span) produced when the belt tooth portion slides into the pulley tooth groove portion becomes too great. This will not allow the belt tooth portion to smoothly slide into the pulley tooth groove portion, therefore pushing up the belt pitch line to increase the nonuniformity of velocity.

The analysis result obtained by the inventor shows that an optimal allowable range for the maximum pressure angle is between an angle of 15 degrees and an angle of 25 degrees as described above. In comparison with the commonly-used pressure angle range (between an angle of 14.2 degrees and an angle of 14.4), the present invention is able to reduce the nonuniformity of velocity more effectively.

Further, the maximum pressure angle at where the power transmission portion of the belt tooth flank surface and the tooth root portion are connected together is between an angle of 16 degrees and an angle of 23 degrees. Furthermore, the maximum pressure angle is between an angle of 17 degrees and an angle of 22 degrees. As a result of such arrangement, the nonuniformity of velocity can be reduced to a further extent.

The present invention provides a toothed belt comprising a belt main body with a pitch line on which a tensile member is embedded therein and a plurality of belt tooth portions provided at a fixed pitch on a land line of the belt main body. Each of the belt tooth portions comprises tooth root portions formed of circularly arcuate surfaces which are arranged symmetrically with each other in respect to a centerline in the tooth width direction, power transmission portions formed of circularly arcuate surfaces of convex profile which contiguously adjoin the tooth root portions, lie at flank surfaces of the tooth portion, and are arranged symmetrically with each other in respect to the tooth width direction centerline, and a tooth tip end portion formed of a circularly arcuate surface which is so provided as to interconnect the power transmission portions and whose center point lies on the tooth width direction centerline, wherein the maximum pressure angle at where the power transmission portion of the belt tooth flank surface and the tooth root portion are connected together is between an angle of 15 degrees and an angle of 25 degrees.

Such a tooth construction is able to provide the same effects as above. Further, since the tooth tip end portion of the belt tooth portion is defined by a single circularly arcuate surface, this makes it possible to further delay the contacting of the belt tooth portion with the pulley tooth groove portion in comparison with increasing only the maximum pressure angle (see the virtual line of FIG. 8). Accordingly, the nonuniformity of belt velocity can be reduced to a further extent.

In such a case, the maximum pressure angle in the toothed belt is between an angle of 16 degrees and an angle of 23 degrees. Further, the maximum pressure angle is between an angle of 17 degrees and an angle of 22 degrees. As a result of such setting, the nonuniformity of velocity of the toothed belt can be reduced to a further extent.

The present invention provides a toothed belt power transmission apparatus comprising a combination of any one of the preceding toothed belts and toothed pulleys each having a plurality of pulley tooth groove portions which are provided at a fixed pitch on a pulley outside diameter line. Each of the pulley tooth groove portions comprises tooth top arc portions formed of circularly arcuate surfaces which are arranged symmetrically with each other in respect to a centerline in the tooth groove width direction, tooth groove flank surface portions formed of circularly arcuate surfaces of concave profile which contiguously adjoin the tooth top arc portions and are arranged symmetrically with each other in respect to the tooth groove width direction centerline, and a tooth groove bottom portion provided so as to interconnect the tooth groove flank surface portions. The belt tooth portion has flank surfaces whose profile is substantially the same as that of flank surfaces of the pulley tooth groove portion. Further, in a power transmission state (i.e., in a working state) in which the toothed belt is wound around the toothed pulleys and a tension force is applied to the toothed belt, the pressure angles of the belt tooth portion flank surface and the pulley tooth groove portion flank surface at their respective locations in the tooth height direction are made approximately equal to each other and a belt land portion comes into contact with a pulley outside diameter portion.

As described above, if the maximum pressure angle is so increased as to fall within the range below 25 degrees (preferably, between an angle of 17 degrees and an angle of 22 degrees), this delays the belt tooth flank surface to come into contact with the pulley tooth groove flank surface, resulting in reducing the nonuniformity of belt velocity. Other than this, even when the pressure angle of the belt tooth portion remains small as in the conventional techniques, it is possible to geometrically delay, within the delay range of the pulley tooth groove portion with respect to the belt tooth portion during low power torque transmission, the contacting of the belt tooth flank surface with the pulley tooth groove flank surface by setting the maximum pressure angle of the pulley tooth groove portion smaller than that of the belt tooth portion. As described above, if the maximum pressure angle of the pulley tooth groove portion is made smaller than that of the belt tooth portion, then the backlash between the belt tooth portion and the pulley tooth groove portion[]gradually increases from root to tip. This is the same construction as shown in the prior art technique (JP Unexamined Patent Application Gazette No. S64-74341).

However, the inventor's research shows that if the maximum pressure angle of the pulley tooth groove portion is set smaller than the maximum pressure angle of the belt tooth portion, this increases the nonuniformity of velocity of the belt. That is to say, when the maximum pressure angle of the pulley tooth groove portion is set smaller than the maximum pressure angle of the belt tooth portion, this certainly delays the contacting of the belt tooth flank surface with the pulley tooth groove flank surface; however, the belt tooth flank surface is brought into contact, not with the pulley tooth groove flank surface but with the tooth top arc portion (see FIG. 5(b)). As a consequence of such contact, the belt tooth portion is pushed up by the tooth top arc portion of the pulley tooth groove-portion, so that the belt tooth portion is unable to smoothly slide into the pulley tooth groove portion and the belt pitch line is pushed up, resulting in increasing the nonuniformity of velocity.

On the other hand, according to the toothed belt power transmission apparatus of the present invention, it is arranged such that the pressure angles of the belt tooth portion flank surface and the pulley tooth groove portion flank surface at their respective locations in the tooth height direction are made approximately equal to each other, so that the belt tooth flank surface comes into uniform contact with the pulley tooth groove flank surface. This allows the belt tooth portion to smoothly slide into the pulley tooth groove portion (see FIG. 5(a)). The belt pitch line will not be pushed up, which considerably reduces the nonuniformity of velocity of the belt.

Further, an arrangement may be made, in which the pulley tooth groove portion of the toothed pulley has a tooth groove bottom portion which is formed of an approximately flat surface. As a result of such arrangement, the tooth groove bottom portion of the pulley tooth groove portion and the tooth crest surface of the belt tooth portion are formed of identical, approximately flat surfaces, which is preferable. The tooth groove bottom portion may be formed of a surface inscribing an arc of a circle having its center in the pulley central direction.

The present invention provides a toothed belt power transmission apparatus comprising a combination of the foregoing toothed belt and toothed pulleys each having a plurality of pulley tooth groove portions which are provided at a fixed pitch on a pulley outside diameter line. Each of the pulley tooth groove portions comprises tooth top arc portions formed of circularly arcuate surfaces which are arranged symmetrically with each other in respect to a centerline in the tooth groove width direction, tooth groove flank surface portions formed of circularly arcuate surfaces of concave profile which contiguously adjoin the tooth top arc portions and are arranged symmetrically with each other in respect to the tooth groove width direction centerline, and a tooth groove bottom portion provided so as to interconnect the tooth groove flank surface portions, wherein the belt tooth portion has flank surfaces whose profile is substantially the same as that of flank surfaces of the pulley tooth groove portion and wherein in a power transmission state in which the toothed belt is wound around the toothed pulleys and a tension force is applied to the toothed belt, the pressure angles of the belt tooth portion flank surface and the pulley tooth groove portion flank surface at their respective locations in the tooth height direction are made approximately equal to each other and a belt land portion comes into contact with a pulley outside diameter portion. This construction is also able to provide the same operation and effects as the above.

Furthermore, in the foregoing toothed belt power transmission apparatus of the present invention, the pulley tooth groove portion of each of the toothed pulleys has a tooth groove bottom portion which comprises a circularly arcuate surface inscribing an arc of a circle whose center point lies on the tooth groove width direction centerline and whose radius is greater than that of the tooth tip end portion of the belt tooth portion. That is to say, in the case the belt tooth portion has a tooth tip end portion which is a circularly arcuate surface (i.e., a curvilinear surface inscribing the arc of a circle), the pulley tooth groove portion may have a tooth groove bottom portion which is an approximately flat surface. In the present invention, however, the tooth groove bottom portion of the pulley tooth groove portion is formed of a circularly arcuate surface whose radius is greater than that of the tooth tip end portion of the belt tooth portion. This arrangement is preferable because the belt tooth portion is able to slide into the pulley tooth groove portion in a much smoother manner.

The present invention provides a toothed belt power transmission apparatus comprising a combination of a toothed belt and toothed pulleys. The toothed belt has a belt main body with a pitch line on which a tensile member is embedded therein, a plurality of belt tooth portions provided at a fixed pitch in the belt main body, and a land portion provided between adjacent belt tooth portions. Each of the belt tooth portions has power transmission portions formed of circularly arcuate surfaces of convex profile which lie at flank surfaces of the tooth portion and are arranged symmetrically with each other in respect to a centerline in the tooth width direction, tooth tip portions formed of circularly arcuate surfaces which contiguously adjoin the power transmission portions and are arranged symmetrically with each other in respect to the tooth width direction centerline, and a tooth crest surface formed of an approximately flat surface which is so provided as to interconnect the tooth tip portions. On the other hand, each of the toothed pulleys has a plurality of pulley tooth groove portions provided at a fixed pitch on a pulley outside diameter line. Each of the pulley tooth groove portions has tooth top arc portions formed of circularly arcuate surfaces which are arranged symmetrically with each other in respect to a centerline in the tooth groove width direction, tooth groove flank surface portions formed of circularly arcuate surfaces of concave profile which contiguously adjoin the tooth top arc portions and are arranged symmetrically with each other in respect to the tooth groove width direction centerline, and a tooth groove bottom portion provided so as to interconnect the tooth groove flank surface portions. The maximum pressure angle at where the tooth top arc portion and the tooth groove flank surface portion in the pulley tooth groove portion are connected together is between an angle of 15 degrees and an angle of 25 degrees and the belt tooth portion has flank surfaces whose profile is substantially the same as that of flank surfaces of the pulley tooth groove portion. Moreover, in a power transmission state in which the toothed belt is wound around the toothed pulleys and a tension force is applied to the toothed belt, the pressure angles of the belt tooth portion flank surface and the pulley tooth groove portion flank surface at their respective locations in the tooth height direction are made approximately equal to each other and a belt land portion does not come into contact with a pulley outside diameter portion.

The arrangement for reducing the nonuniformity of belt velocity by increasing the maximum pressure angle is effective for toothed belt power transmission apparatus that are used in such a condition that the belt land portion does not come into contact with a pulley outside diameter portion. However, in such a case, areas of the belt land portion, the tooth root portion of the tooth portion, and the tooth flank surface that lie outside beyond the pulley outside diameter portion in the radial direction have no direct influence on the behaviors of the belt tooth portion at the time of meshing. Accordingly, the maximum pressure angle of the belt tooth portion in the belt alone is not important, but the maximum pressure angle at a connection point of the tooth top arc portion and the tooth groove flank surface portion is important. In accordance with the present invention, the maximum pressure angle at where the tooth top arc portion and the tooth groove flank surface portion are connected together is between an angle of 15 degrees and an angle of 25 degrees, as a result of which arrangement the same operation and effects as the above can be obtained.

In the above-described toothed belt power transmission apparatus, the land portion of the toothed belt comprises an approximately flat surfaces which is interconnected with the belt tooth portion flank surfaces through tooth root portions formed of circularly arcuate surfaces which are arranged symmetrically with the tooth width direction centerline.

The land portion of the belt, since there is no constraint when taking into account the nonuniformity of belt velocity, may be formed of a circularly arcuate surface; however, it is preferable that the belt land portion be formed of an approximately flat surface. That is to say, toothed belts made of polyurethane have been used widely in equipment for business use because they are superior in the shape accuracy of tooth portions or the like. Particularly, when the belt tooth portion pitch is below 1.5 mm, nearly all of toothed belts are made of polyurethane, for rubber belts are not able to meet requirements of the business equipment because they are poor in tooth shape accuracy. In such a polyurethane toothed belt, a concave portion is practically provided in the belt land portion in order to separate the core cord from the land line. However, when the belt tooth portion pitch is below 1.5 mm, the formation dimensions of such a concave portion are considerably small, resulting in difficult die processing. In order to cope with such a problem, the core cord is provided directly over the land line without the provision of the foregoing concave portion, and the belt is used in such a condition that the belt land portion is not brought into contact with a pulley outside diameter portion so as to prevent the core cord from being damaged by contact with the pulley outside diameter portion. In such a case, since in the present invention the belt land portion is an approximately flat surface, the position of the core cord can be made stable by the belt land portion which is approximately flat.

In such a case, the maximum pressure angle at where the tooth top arc portion and the tooth groove flank surface portion in the pulley tooth groove portion of the toothed belt power transmission apparatus are connected together is between an angle of 16 degrees and an angle of 23 degrees. Further, the maximum pressure angle is between an angle of 17 degrees and an angle of 22 degrees. As a result of such arrangement, the nonuniformity of toothed belt velocity can be reduced to a further extent.

Further, in the present invention, the pulley tooth groove portion of the toothed pulley has a tooth groove bottom portion which is formed of an approximately flat surface. As a result of such arrangement, when the belt is wound around the pulley, the toot tip end portion of the belt tooth portion can be received at the tooth groove bottom portion of the pulley tooth groove portion whose area is large. This makes it possible to stabilize the core cord position (pitch line) of the belt when wound around the pulley. This reduces the nonuniformity of velocity to a further extent.

The present invention provides a toothed belt power transmission apparatus comprising a combination of a toothed belt and toothed pulleys. The toothed belt has a belt main body with a pitch line on which a tensile member is embedded therein, a plurality of belt tooth portions provided at a fixed pitch in the belt main body, and a land portion provided between adjacent belt tooth portions. Each of the belt tooth portions has power transmission portions formed of circularly arcuate surfaces of convex profile which lie at flank surfaces of the tooth portion and are arranged symmetrically with each other in respect to a centerline in the tooth width direction and a tooth tip end portion formed of a circularly arcuate surface which is so provided as to interconnect the power transmission portions and whose center point lies on the tooth width direction centerline. On the other hand, each of the toothed pulleys has a plurality of pulley tooth groove portions provided at a fixed pitch on a pulley outside diameter line. Each of the pulley tooth groove portions has tooth top arc portions formed of circularly arcuate surfaces which are arranged symmetrically with each other in respect to a centerline in the tooth groove width direction, tooth groove flank surface portions formed of circularly arcuate surfaces of concave profile which contiguously adjoin the tooth top arc portions and are arranged symmetrically with each other in respect to the tooth groove width direction centerline, and a tooth groove bottom portion provided so as to interconnect the tooth groove flank surface portions. The maximum pressure angle at where the tooth top arc portion and the tooth groove flank surface portion in the pulley tooth groove portion are connected together is between an angle of 15 degrees and an angle of 25 degrees. The belt tooth portion has flank surfaces whose profile is substantially the same as that of flank surfaces of the pulley tooth groove portion. In a power transmission state in which the toothed belt is wound around the toothed pulleys and a tension force is applied to the toothed belt, the pressure angles of the belt tooth portion flank surface and the pulley tooth groove portion flank surface at their respective locations in the tooth height direction are made approximately equal to each other and a belt land portion does not come into contact with a pulley outside diameter portion.

That is to say, in accordance with the toothed belt power transmission apparatus of the present invention, the construction of the belt tooth portion is changed to the same one as the above and the same operation and effects as the above can be obtained.

In such a case, the land portion of the toothed belt in the toothed belt power transmission apparatus comprises an approximately flat surface which is interconnected with the belt tooth portion flank surfaces through tooth root portions formed of circularly arcuate surfaces which are arranged symmetrically with the tooth width direction centerline. Such arrangement provides the same effects as the above.

Further, in accordance with the toothed belt power transmission apparatus of the present invention, the maximum pressure angle at where the tooth top arc portion and the tooth groove flank surface portion in the pulley tooth groove portion are connected together is between an angle of 16 degrees and an angle of 23 degrees. Moreover, the maximum pressure angle is between an angle of 17 degrees and an angle of 22 degrees. As a result of such arrangement, the nonuniformity of toothed belt velocity can be reduced to a further extent.

In accordance with the toothed belt power transmission apparatus, the pulley tooth groove portion of the toothed pulley has a tooth groove bottom portion which comprises a circularly arcuate surface inscribing an arc of a circle whose center point lies on the tooth groove width direction centerline and whose radius is greater than that of the tooth tip end portion of the belt tooth portion. Such arrangement provides the same effects as the above.

Finally, the present invention provides equipment for use in business applications which is provided with a toothed belt power transmission apparatus formed in accordance with the present invention wherein a carriage is attached to the toothed belt. As a result of such arrangement, during the operating time of the toothed belt power transmission apparatus, when the carriage is shifted for performing character printing, the variation in carriage velocity caused by the nonuniformity of belt velocity is reduced. This makes it possible for the carriage to provide improved printing accuracy and image quality.

BEST MODE FOR CARRYING OUT THE INVENTION

Figure 3:
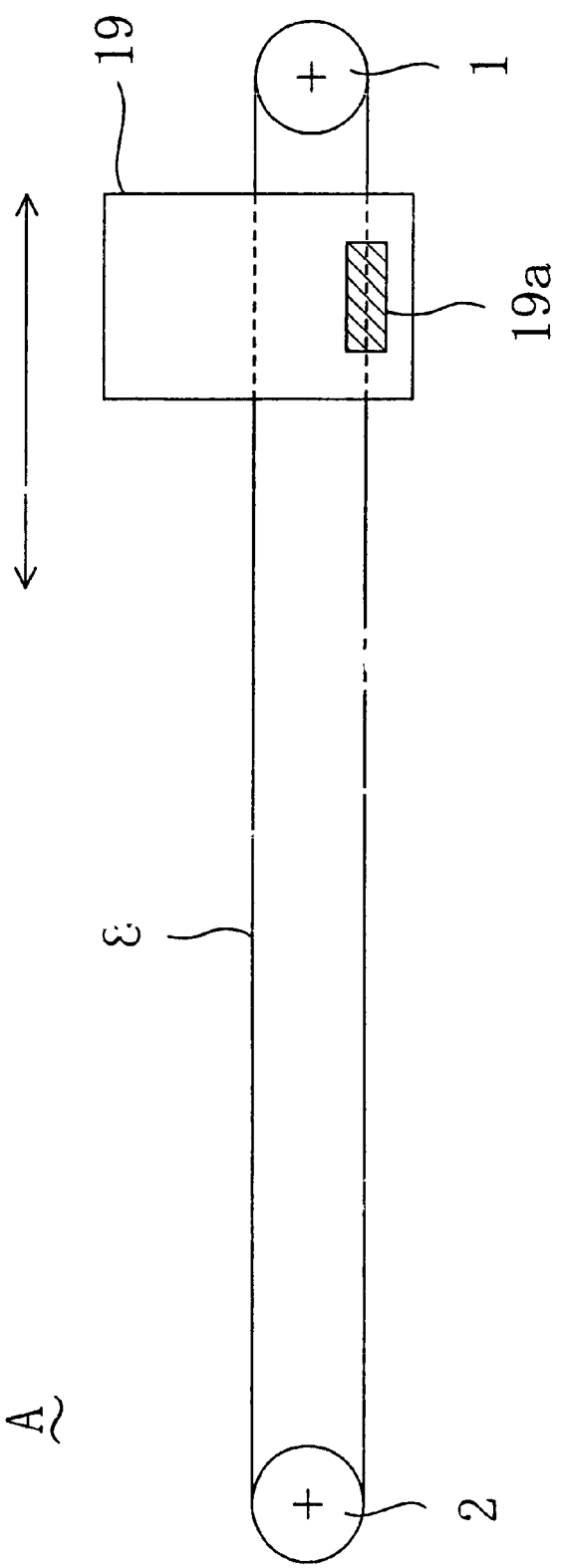
FIG. 3 is a front view schematically showing the entire structure of a toothed belt power transmission apparatus.

Best modes for carrying out the present invention will be described below by making reference to the accompanying drawings. Referring first to FIG. 3, there is shown the entire structure of a toothed belt power transmission apparatus A according to a first embodiment of the present invention. The power transmission apparatus A is of the type that is mounted in business equipment such as printers or photo-copiers. In FIG. 3, the reference numeral 1 denotes a driving pulley formed of a toothed pulley and the reference numeral 2 denotes a driven pulley formed of a toothed pulley. These pulleys 1 and 2 are so arranged as to opposite to each other in horizontal direction. A toothed belt 8 is wound around both the pulleys 1 and 2, being in meshing engagement therewith. A carriage 19 carrying a supply of ink and a printing mechanisms such a hammer is fixedly attached, at its attachment portion 19a, to a lower span of the toothed belt 8 so as to be movable together with the toothed belt 8. The pulleys 1 and 2 are forwarded and reversed to cause the toothed belt 8 to travel, so that the carriage 19 reciprocates between the driving pulley 1 and the driven pulley 2.

Figure 2:
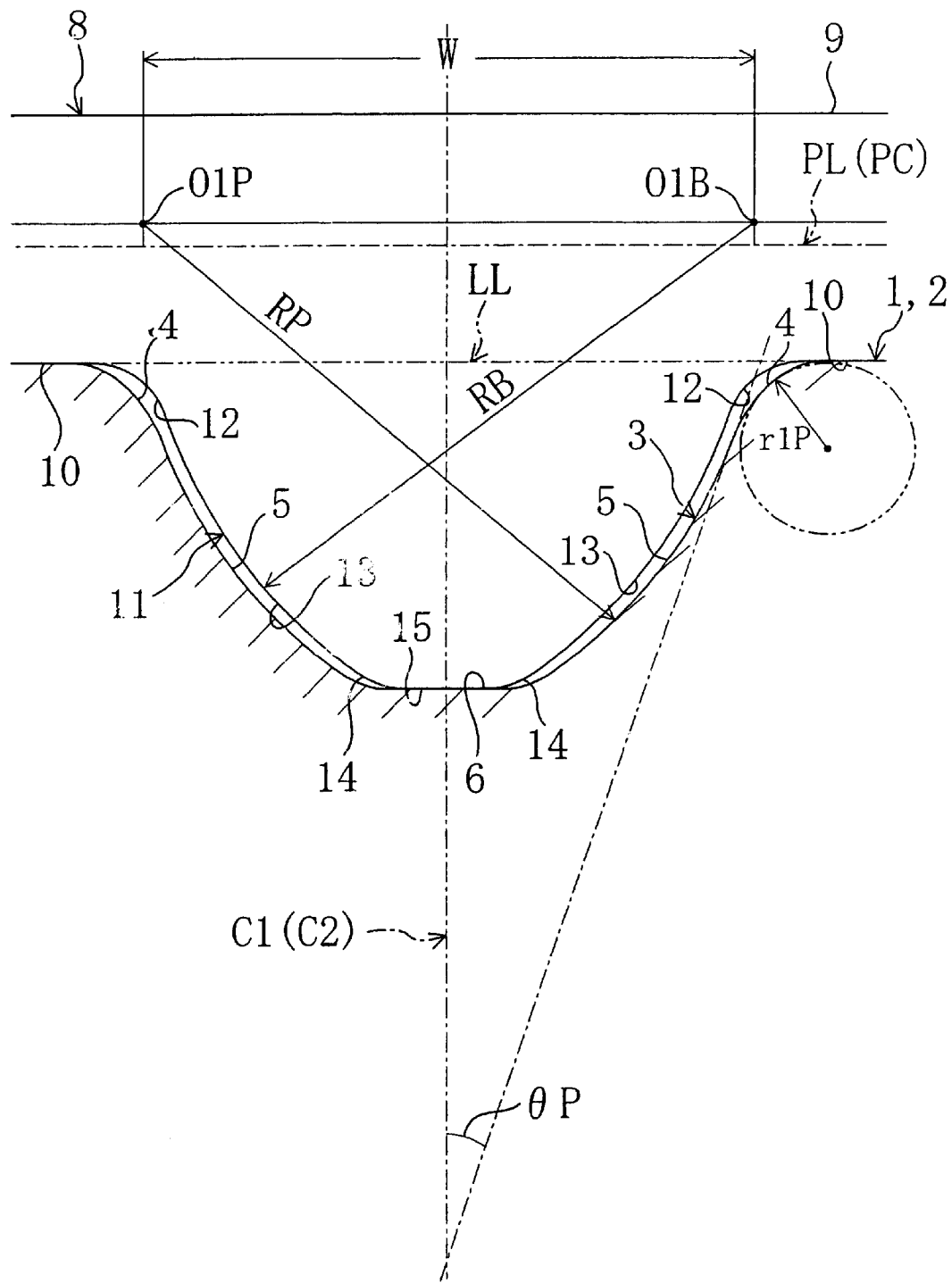
FIG. 2 is an enlarged cross-sectional view illustrating in a developed manner a state when a belt tooth portion is in meshing engagement with a toothed pulley in a toothed belt power transmission apparatus according to the first embodiment.

As enlargedly shown in FIG. 2, the driving and driven pulleys 1 and 2 (the toothed pulleys) each have a plurality of pulley tooth grooves 3, 3, ... (only one of which is shown in the figure) which are uniformly spaced apart by a fixed pitch on an outside diameter line of the pulley outer periphery. Each pulley tooth groove portion 3 has (a) a pair of tooth top arc portions 4, 4 formed of curvilinear surfaces each inscribing an arc of a circle (i.e., circularly arcuate surfaces) having a radius r1P which are arranged symmetrically with each other in respect to its centerline C1 in the tooth groove width direction, (b) a pair of tooth groove flank surface portions 5, 5 formed of circularly arcuate surfaces of concave profile having a center point O1P in the vicinity of a pitch circle PC (i.e., the same point as the circularly arcuate surface center point O1B of a power transmission portion 13 in a tooth portion 11 of the toothed belt 8 which is brought into meshing engagement with the pulleys 1 and 2 as described later) and a radius RP greater than the tooth width W of the toothed belt 8 which contiguously adjoin the tooth top arc portions 4, 4 and are arranged symmetrically with each other in respect to the tooth groove width direction centerline C1, and (c) a tooth groove bottom portion 6 formed of an approximately flat surface which interconnects the tooth groove flank surface portions 5, 5 (note that in FIG. 2 the outer periphery of the pulley 1 (2) is shown in a developed manner together with the toothed belt 8 for the purpose of providing an easy understanding).

Figure 1:
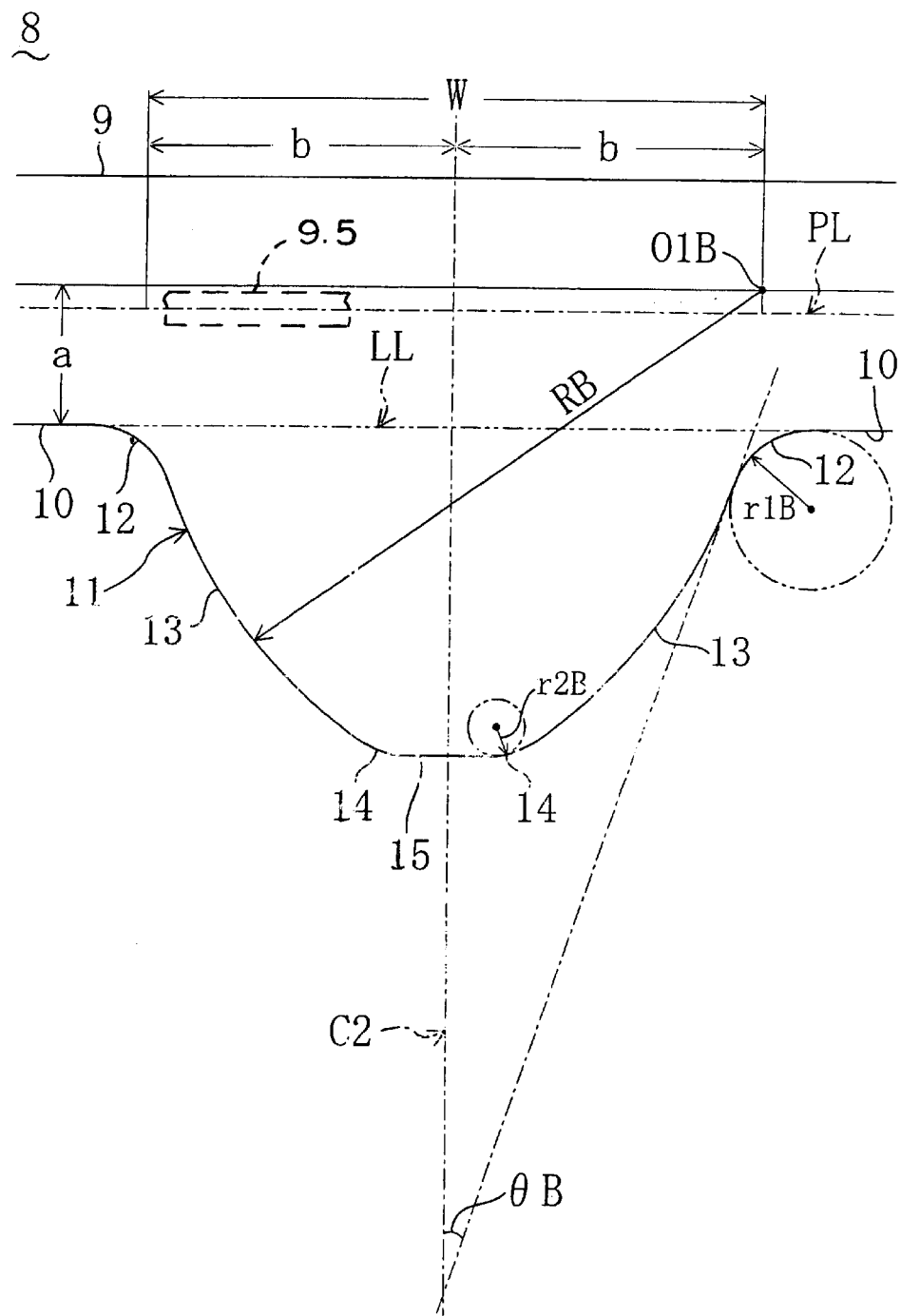
FIG. 1 shows in cross section an enlarged tooth portion of a toothed belt in a first embodiment of the present invention.

On the other hand, as enlargedly shown in FIG. 1, the toothed belt 8 has a belt main body 9 made of elastic material. It is preferable that the belt main body 9 be made of either rubber or polyurethane. Other than these materials, the belt main body 9 may be formed of, for example, synthetic resin material. As rubber material for the belt main body 9, chloroprene rubber is used. Other than chloroprene rubber, either NBR, SBR, EPDM, or the like may be useful. These rubber materials preferably have a JIS-A hardness between about 65 degrees to about 85 degrees. Thermohardening ether polyurethane may be used as a material to form the belt main body 9. Thermoplastic ester polyurethane may be used also as a material to form the belt main body 9.

Further, embedded in the belt main body 9 on a pitch line PL thereof is a core cord 9.5 shown in phantom that serves as a tensile member. The core cord is usually formed of glass fiber or aramid fiber, regardless of which one of rubber or polyurethane is used to form the belt main body 9. Instead, the core cord may be made of carbon fiber or PBO fiber. For the reduction of electric power that is consumed by business equipment, it is required that core cords of smaller diameter be used for the achievement of loss torque reduction.

Further, in view of reducing the nonuniformity of velocity of the toothed belt 8, it is better to employ core cords of a high elastic modulus from the point that the rigidity of the toothed belt 8 is reduced in order that the pitch line PL of the toothed belt 8 can be maintained stable, and from the point that the tension elastic modulus of the toothed belt 8 is increased in order that meshing interference under load can be reduced by maintaining the tooth pitch f or the rapid reduction of velocity variation taking place when business equipment is started.

A plurality of tooth portions 11, 11, ... (only one of which is shown in the figure) having a tooth wide W are provided on a land line LL of the belt main body 9 in the direction of the belt length at a fixed pitch. A land portion 10 is defined at a bottom surface of the belt main body 9 between tooth portions 11, lying on the land line LL. Although there are no particular constraints for the pitch of the tooth portions 11, a pitch between 0.5 mm and 3.0 mm is selected for business machine parts.

When the belt main body 9 is made of rubber, a fabric of synthetic fiber (not shown in the figure) is applied onto the surface of the tooth portion 11. It is preferred that such a fabric be made of polyamide fiber. Instead of using polyamide, polyester fiber may be useful. The fabric is usually subjected to adhesion treatment such as RF treatment, epoxy treatment, RFL treatment, or the like, and then to rubber cement treatment. In some cases, such rubber cement treatment is carried out on both sides of the fabric. However, especially for the case of equipment for use in business applications, scattering of rubber powders from the toothed belt 8 surface is undesirable. In addition, in view of the reduction of velocity nonuniformity of the toothed belt 8, it is necessary to decrease the coefficient of friction of the toothed belt 8 surface. Therefore, it is better not to subject the outer surface of the tooth portion 11 to rubber treatment.

On the other hand, when the belt main body 9 is made of polyurethane, no fabric is applied onto the surface of the tooth portion 11 and only a core cord is embedded in the belt main body 9.

The present invention is characterized by the profile of the belt tooth portion 11 and the profile of the pulley tooth groove portion 3. That is to say, as shown in FIG. 1, each belt tooth portion 11 has, at its both sides in the belt length direction, (a) a pair of tooth root portions 12, 12 formed of circularly arcuate surfaces having a predetermined radius r1B which are arranged symmetrically with each other in respect to the centerline C2 in the tooth width direction of the belt tooth portion 11 (i.e., the belt length direction centerline) and contiguously adjoin their respective land portions 10, (b) a pair of power transmission portions 13, 13 formed of circularly arcuate surfaces of convex profile having a radius RB which contiguously adjoin the tooth root portions 12, 12, lie at flank surfaces of the tooth portion 11, and are arranged symmetrically with each other in respect to the tooth width direction centerline C2, (c) a pair of tooth tip portions 14, 14 formed of circularly arcuate surfaces having a predetermined radius r2B which contiguously adjoin the power transmission portions 13, 13 and are arranged symmetrically with each other in respect to the tooth width direction centerline C2, and (d) a tooth crest surface 15 formed of an approximately flat surface which is so provided as to interconnect the tooth tip portions 14, 14.

It is preferable that a center point O1B, i.e., the center point of the circularly arcuate surface of each power transmission portion 13, be located either on the pitch line PL of the toothed belt 8 or in the vicinity thereof. The center point O1B is desirably located within a specific range, in other words the center point O1B is located a distance a (=0.13 to 0.42 W) from the land line LL and a distance b (=0.2 to 0.81 W) from the tooth width direction centerline C2 of the belt tooth portion 11 where W is the tooth width (i.e., the width of the tooth portion 11). Further, preferably, the radius RB of the circularly arcuate surface of each power transmission portion 13 is set approximately equal to the tooth width W or greater than the tooth width W (i.e., RB=W or RB>W), more preferably, RB=1.0 to 1.5 W.

In the toothed belt 8, the maximum pressure angle θB at where the power transmission portion 13 at the belt tooth 11 flank surface and the tooth root portion 12 are connected together, is set to θB=15 to 25 degrees, preferably θB=16 to 23 degrees. More preferably, θB=17 to 22 degrees. Optimally, θB=19.3 degrees as shown in the figure.

Furthermore, as shown in FIG. 2, the profile of the flank surface (i.e., the tooth width direction flank surface) of the belt tooth portion 11 is approximately similar to the profile of the flank surface (i.e., the tooth groove width direction flank surface) of the pulley tooth groove portion 3. In an actual power transmission state wherein the toothed belt 8 is wound around both the pulleys 1 and 2 and a tension force is applied to the toothed belt 8, the pressure angle of the belt tooth portion 11 flank surface and the pressure angle of the pulley tooth groove portion 3 flank surface at their respective flank surface points in the tooth height direction are made approximately equal to each other and, in addition, it is such constructed that the land portion 10 of the toothed belt 8 is brought into contact with a pulley outside diameter portion.

Accordingly, in the present embodiment, as shown in FIG. 4, when the tooth portion 11 of the toothed belt 8 comes into meshing engagement with the tooth groove portion 3 of the driving pulley 1 implemented by a toothed pulley, such engagement of the belt tooth portion with the pulley tooth groove portion takes place at a location which is somewhat delayed with respect to the location of the pulley tooth groove portion because of the influence of load torque that is applied. Consequently, an aft flank surface of the belt tooth portion 11 in respect to the traveling direction is first brought into contact with a flank surface of the pulley tooth groove portion 3. Thereafter, the belt tooth portion 11 slides into the pulley tooth groove portion 3.

At that time, the belt pitch line PL moves, at a span of the toothed belt 8 (i.e., at a belt portion that is not wound around the pulley), vertically in a direction normal to the belt span, which causes meshing velocity nonuniformity. The amount of vertical movement of the pitch line PL is determined by a reaction force that is produced when the belt tooth portion 11 slides into the pulley groove portion 3 and a component of a belt tension force that is produced when the toothed belt 8 is pushed upward by the reaction force. Therefore, as the contact position moves away from where the belt tooth portion 11 and the pulley tooth groove portion 3 perfectly engage with each other, the component force decreases while the amount of pushing up the pitch line PL increases, so that if the contacting of the belt tooth portion 11 with the pulley tooth groove portion 3 takes place early, this results in increasing the nonuniformity of velocity.

Figure 4A:
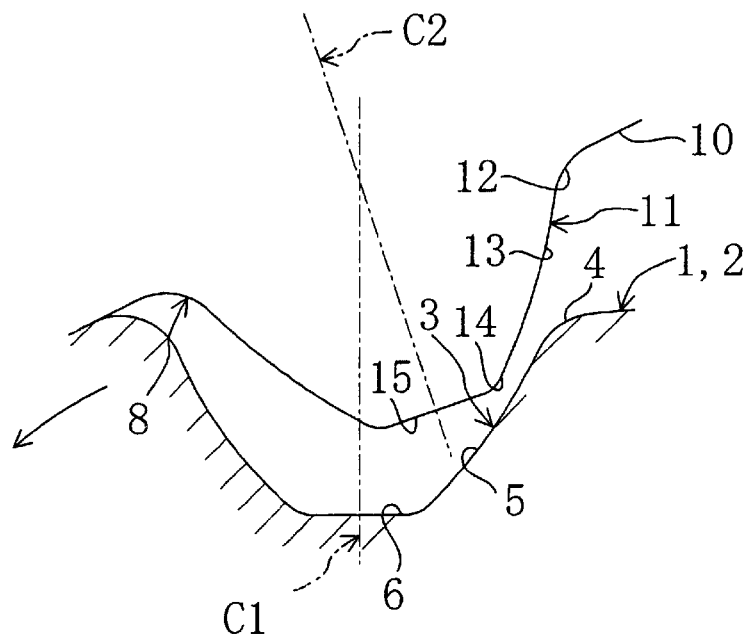
FIGS. 4(a) and 4(b) are explanatory diagrams schematically showing a state when a belt tooth portion is in meshing engagement with a pulley tooth groove portion.
Figure 4B:
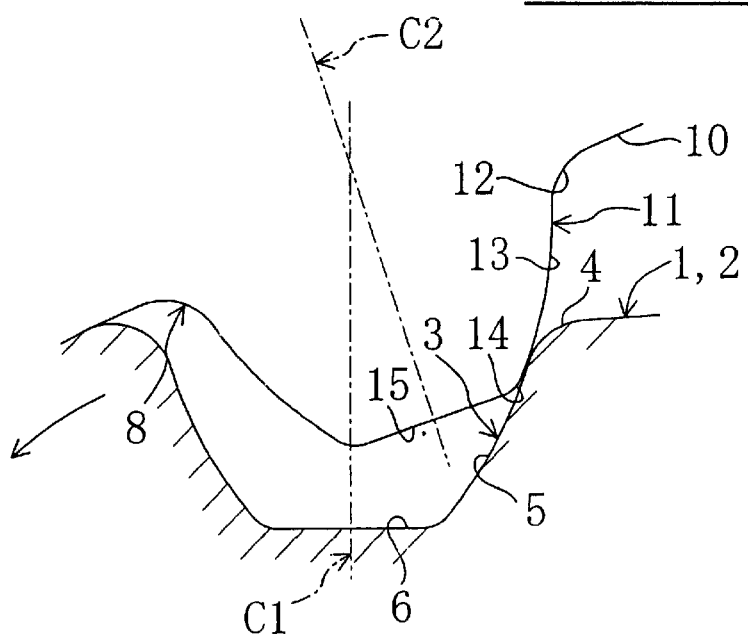

As FIG. 4(b) shows, in the conventional toothed belt 8, since the maximum pressure angle θB of the belt tooth portion 11 flank surface is small (i.e., θB=14.2 to 14.4 degrees), this causes the belt tooth portion 11 flank surface to early come into contact with the pulley tooth groove portion 3 flank surface. On the other hand, in the present embodiment, as shown in FIG. 4(a), the maximum pressure angle is greater than the conventional one, that is, θB=≧15 degrees. This arrangement delays the contacting of the belt tooth portion 11 flank surface with the pulley tooth groove 3 flank surface, thereby making it possible to reduce the nonuniformity of velocity of the toothed belt 8.

As described above, the belt tooth portion 11 flank surface is brought into contact with the pulley tooth groove portion 3 flank surface. This is followed by the belt tooth portion 11 sliding into the pulley tooth groove portion 3, producing a reaction force which, together with a component of a belt tension force, determines the amount of shift of the belt span. At that time, if the maximum pressure angle θB is too great, this excessively increases a component of a reaction force produced when the belt tooth portion 11 slides into the pulley tooth groove portion 3 in a vertical direction (i.e., in a direction normal to the belt span). This prevents the belt tooth portion 11 from smoothly sliding into the pulley tooth groove portion 3 and the belt pitch line PL is pushed upward. This, on the contrary, further increases the nonuniformity of velocity of the toothed belt 8. However, in the present embodiment, the maximum pressure angle θB is θB≦25 degrees in order that the belt tooth portion 11 can smoothly slide into the pulley tooth groove portion 3. This suppresses the increase in the nonuniformity of velocity of the toothed belt 8. That is to say, if the value of the maximum pressure angle θB is set to fall within the range between an angle of 15 degrees and an angle of 25 degrees, this reduces the nonuniformity of velocity of the toothed belt 8 as low as possible.

Figure 5A:
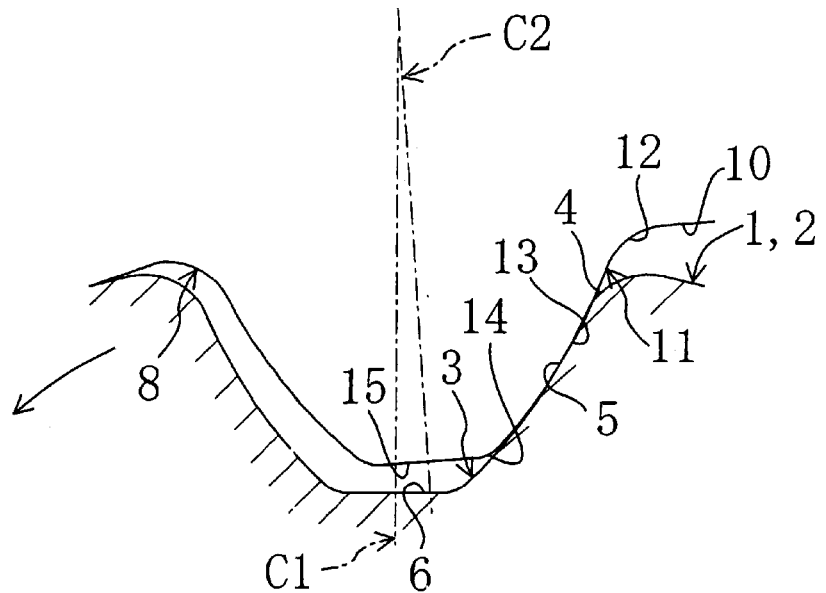
FIGS. 5(a) and 5(b) correspond to FIGS. 4(a) and 4(b) showing a meshing engagement state when the pressure angle of a belt tooth flank surface is approximately equal to that of a pulley tooth groove flank surface.
Figure 5B:
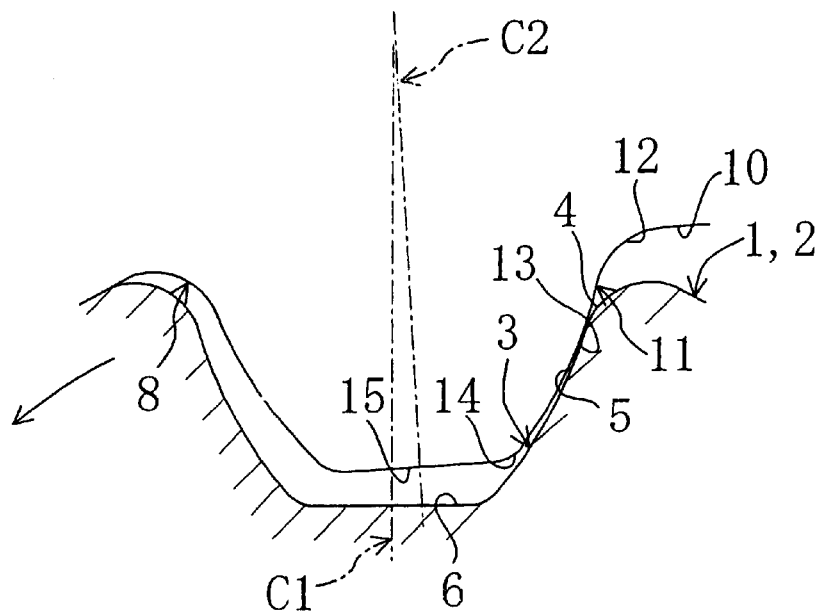

Moreover, in the present embodiment, the pressure angle of the flank surface of the belt tooth portion 11 and the pressure angle of the flank surface of the pulley tooth groove portion 3 at their respective locations in the tooth height direction are approximately equal to each other, so that as shown in FIG. 5(a) the belt tooth portion 11 flank surface comes into uniform contact with the pulley tooth groove portion 3 flank surface, thereby allowing the belt tooth portion 11 to smoothly slide into the pulley tooth groove portion 3. If the maximum pressure angle of the pulley tooth groove portion 3 is set greater than that of the belt tooth portion 11, this causes the belt tooth portion 11 flank surface to come into contact, not with the pulley tooth groove portion 3 flank surface, but with the tooth top arc portion 4 of the pulley tooth groove portion 3. As a result, the belt tooth portion 11 is pushed up by the tooth top arc potion 4 of the pulley tooth groove portion 3 (see FIG. 5(b)). Unlike FIG. 5(b)), in the present embodiment the nonuniformity of velocity of the toothed belt 8 can be suppressed to a further extent. In this way, the nonuniformity of velocity of the toothed belt 8 is reduced as low as possible. This provides improvements in, for example, the printing accuracy and image quality of business equipment. Furthermore, in the pulleys 1 and 2 the tooth groove bottom portion 6 of the pulley tooth groove portion 3 is formed of an approximately flat surface. Therefore, the tooth groove bottom portion 6 of the pulley tooth groove portion 3 and the tooth crest surface 15 of the belt tooth portion 11 may be formed of identical, approximately flat surfaces. The tooth groove bottom portion 6 may be formed of a curvilinear surface inscribing an arc of a circle having its center in the pulley center direction.

Figure 6:
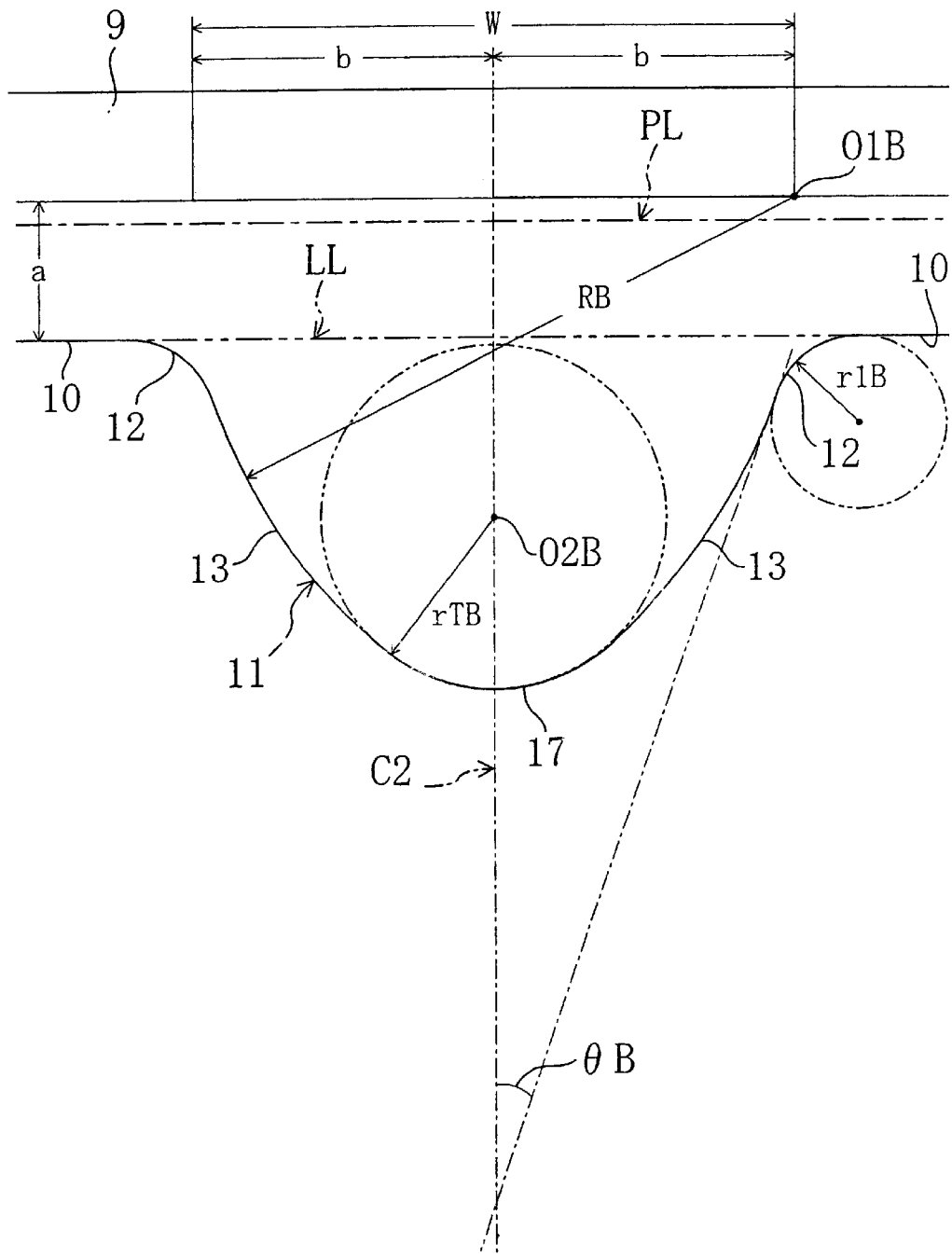
FIG. 6 corresponds to FIG. 1, showing a tooth portion of a toothed belt in a second embodiment of the present invention.
Figure 7:
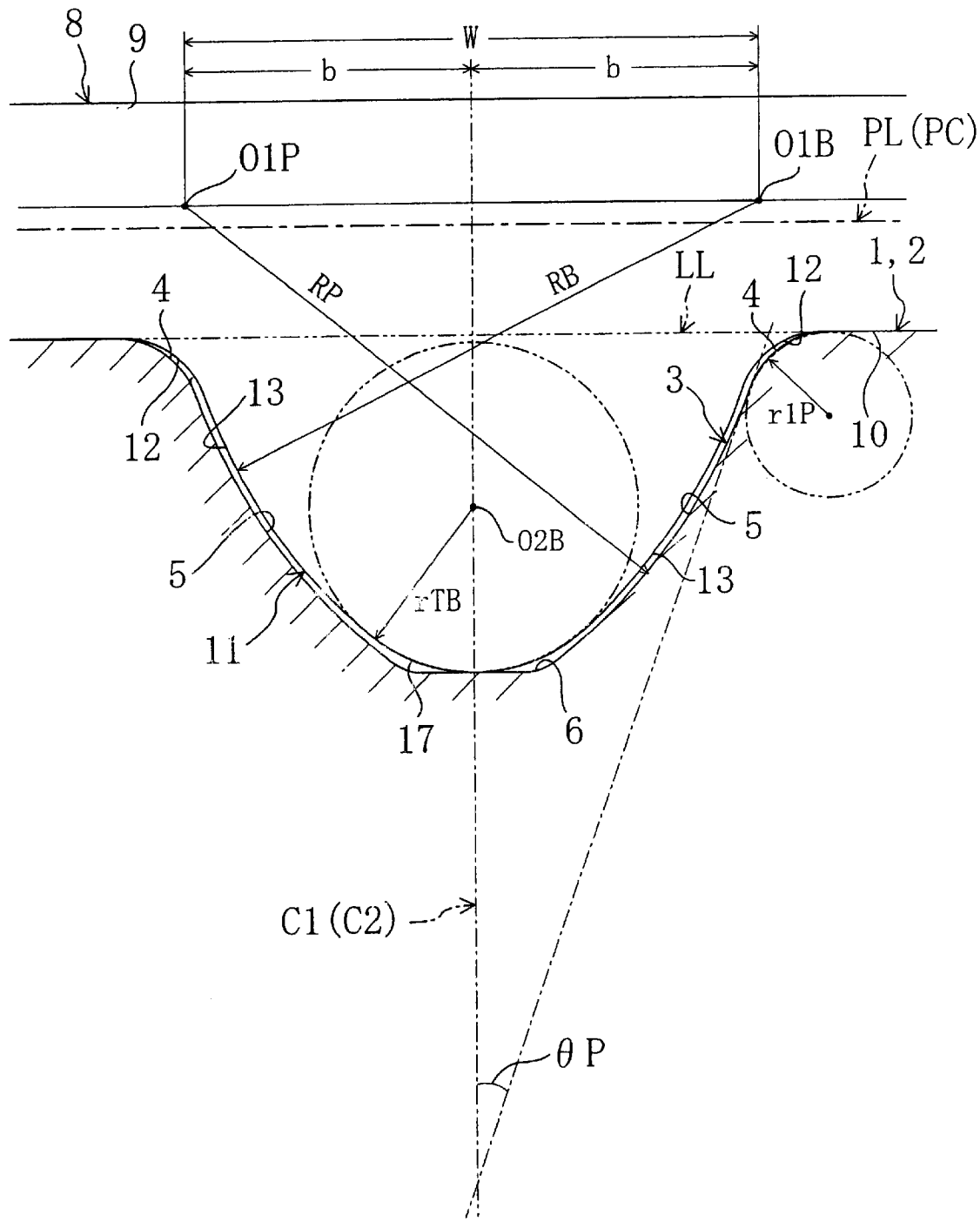
FIG. 7 corresponds to FIG. 2, showing the second embodiment.

Reference is now made to FIGS. 6 and 7 which show a second embodiment of the present invention. Note that in each of the following embodiments of the present invention the same portions as ones shown in FIGS. 1 and 2 have been assigned the same reference numerals and they will not be described in detail. In the present embodiment, the profile of the belt tooth portion 11 is changed.

More specifically, in accordance with the present embodiment, as shown in FIG. 7, each of the pulley tooth groove portion 3 of the pulleys 1 and 2 has (a) the tooth top arc portions 4, 4 formed of circularly arcuate surfaces which are arranged symmetrically with each other in respect to the tooth groove width direction centerline C1, (b) the tooth groove flank surface portions 5, 5 formed of circularly arcuate surfaces of concave profile which contiguously adjoin the tooth top arc portions 4, 4 and are arranged symmetrically with each other in respect to the tooth groove width direction centerline C1, and (c) the tooth groove bottom portion 6 formed of an approximately flat surface which is so provided as to interconnection the tooth groove flank surface portions 5, 5.

On the other hand, as shown in FIGS. 6 and 7, each of the belt tooth portions 11 of the toothed belt 8 has, at its both sides in the belt length direction, (a) the tooth root portions 12, 12 formed of circularly arcuate surfaces having the predetermined radius r1B which are arranged symmetrically with each other in respect to the tooth width direction centerline C2 of the belt tooth portion 11 and contiguously adjoin their respective land portions 10, 10, (b) the power transmission portions 13, 13 formed of circularly arcuate surfaces of convex profile having the radius RB which contiguously adjoin the tooth root portions 12, 12, lie at the flank surfaces of the belt tooth portion 11, and are arranged symmetrically with each other in respect to the tooth width direction centerline C2, and (c) a tooth tip end portion 17 formed of a circularly arcuate surface having its center point O2B on the tooth width direction centerline C2 of the belt tooth portion 11 and a radius rTB, the portion 17 being so provided as to interconnect the power transmission portions 13, 13.

As in the first embodiment, the maximum pressure angel θB at where the power transmission portion 13 of the flank surface of the belt tooth portion 11 and the tooth root portion 12 are connected together, is set to θB=15 degrees to 25 degrees, preferably, θB=16 degrees to 23 degrees. More preferably, θB=17 degrees to 22 degrees. Optimally, θB=19.3 degrees, as shown in the figure.

Furthermore, the belt tooth portion 11 is approximately similar in flank surface profile to the pulley tooth groove portion 3. In an actual power transmission state wherein the toothed belt 8 is wound around both the pulleys 1 and 2 and a tension force is applied to the toothed belt 8, the pressure angle of the belt tooth portion 11 flank surface and the pressure angle of the pulley tooth groove portion 3 flank surface at their respective flank surface points in the tooth height direction are made approximately equal to each other and, in addition, it is such constructed that the land portion 10 of the toothed belt 8 is brought into contact with a pulley outside diameter portion. The other constructions of the present invention are the same as the first embodiment.

Figure 8:
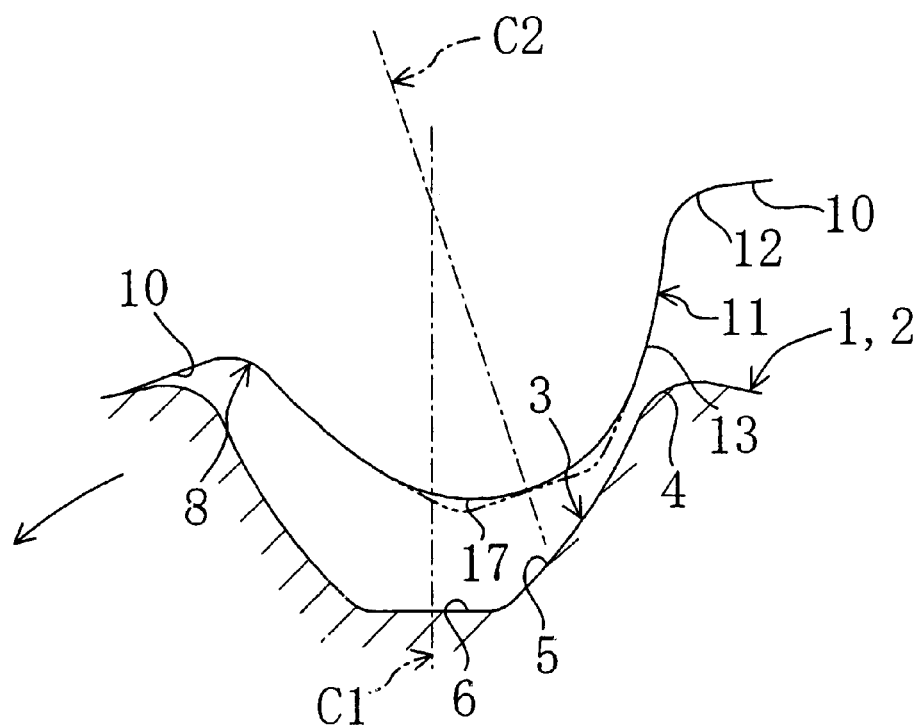
FIG. 8 corresponds to FIG. 4, schematically showing a state when a belt tooth portion is in meshing engagement with a pulley tooth groove portion in the second embodiment.

Accordingly, also in the present embodiment, the same operation and effects as the first embodiment can be obtained. Additionally, since the tooth tip end portion 17 of the belt tooth portion 11 is formed of a single circularly arcuate surface, this arrangement makes it possible to further delay the contacting of the belt tooth portion 11 with the pulley tooth groove portion 3 as indicated by solid line of FIG. 8. This provides the advantage that the nonuniformity of velocity of the toothed belt 8 can be reduced effectively to a further extent as compared with the arrangement in which only the maximum pressure angle is increased as indicated by virtual line of FIG. 8.

Figure 9:
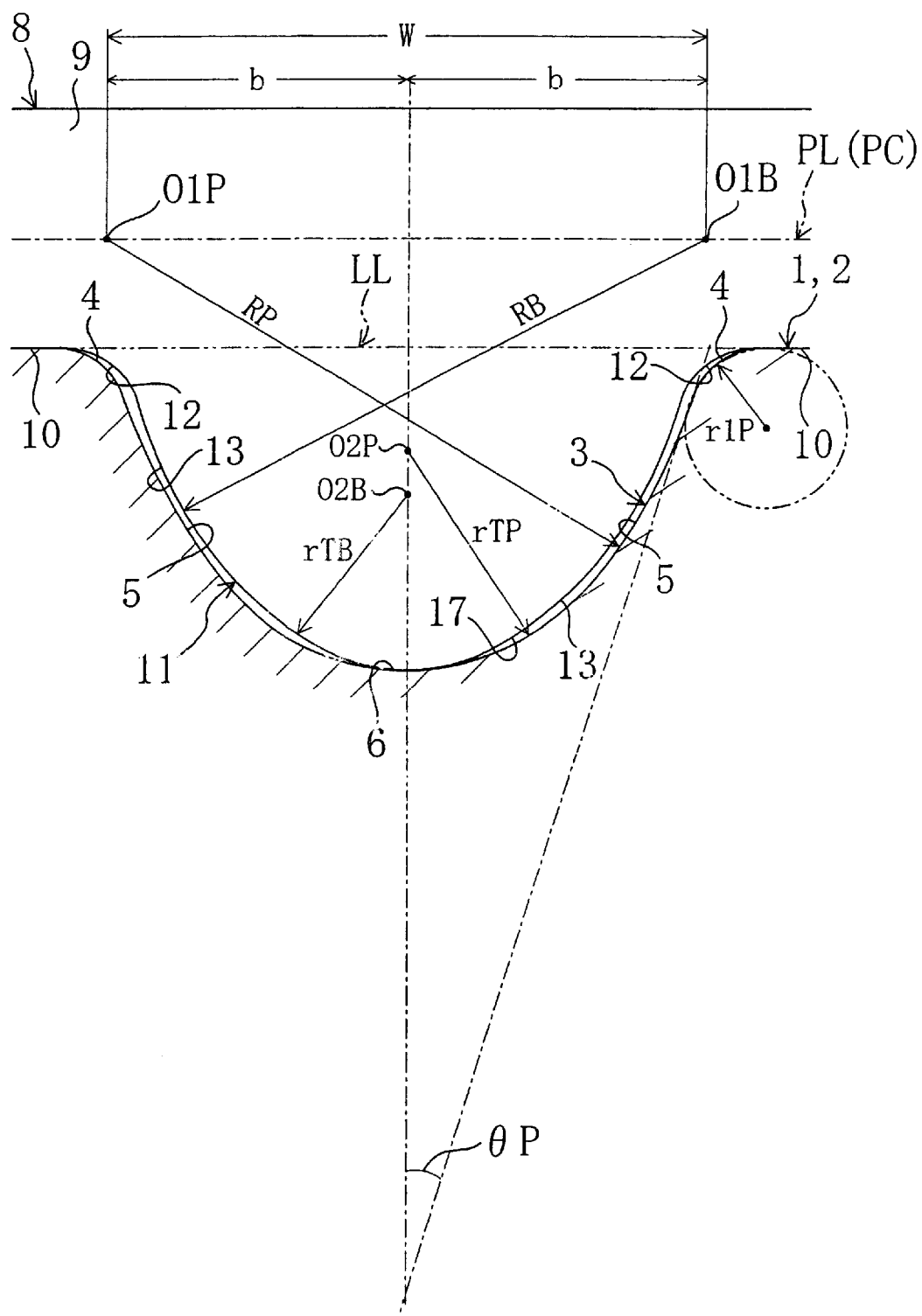
FIG. 9 corresponds to FIG. 2, showing a third embodiment of the present invention.

Reference is now made to FIG. 9 which shows a third embodiment of the present invention. In the third embodiment, the tooth portion 11 of the toothed belt 8 is provided, at its tooth tip end area, with the tooth tip end portion 17 formed of a single circularly arcuate surface for interconnecting the power transmission portions 13, 13 on both the belt length direction sides, as in the second embodiment.

On the other hand, the tooth groove bottom portion 6 of the pulley tooth groove portion 3 of each of the pulleys 1 and 2 is formed of a single circularly arcuate surface having its center point O2P on the tooth groove width direction centerline C1 and a radius rTP slightly greater than the radius rTB of the tooth tip end portion 17 of the belt tooth portion 11.

In the present embodiment, the tooth groove bottom portion 6 of the tooth groove portion 3 is formed of a circularly arcuate surface having the radius rTP slightly greater than the radius rTB of the circularly arcuate surface of the tooth tip end portion 17 of the belt tooth portion 11. This arrangement enables the belt tooth portion 11 to more smoothly slide into the pulley tooth groove portion 3, thereby more effectively suppressing the increase in the nonuniformity of velocity of the toothed belt 8.

Figure 10:
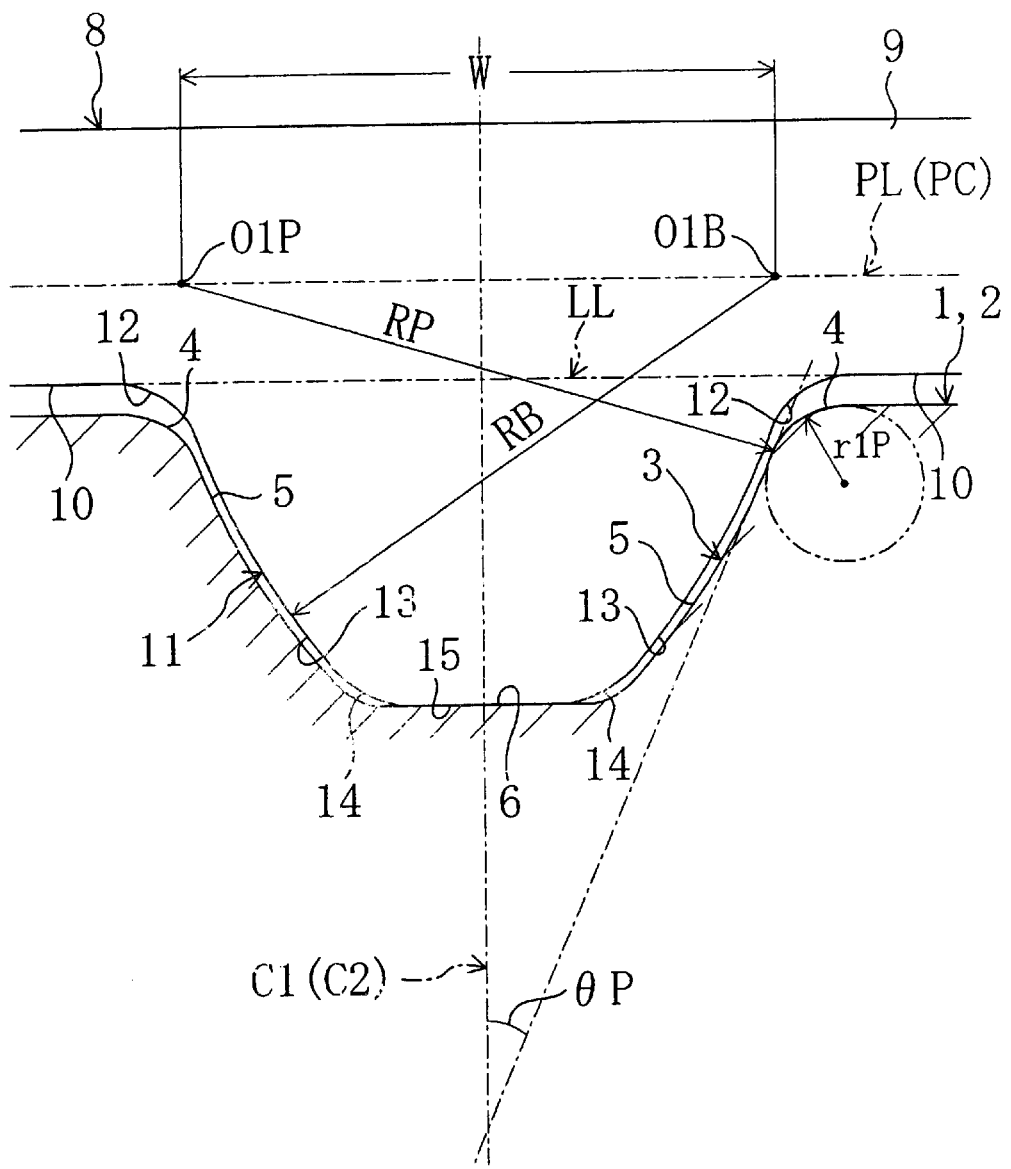
FIG. 10 corresponds to FIG. 2, showing another embodiment of the present invention in which a belt land portion is not brought into contact with a pulley outer diameter portion in a power transmission state in which tension is applied to the belt.

In the first embodiment, in the power transmission state in which the toothed belt is wound around the pulleys 1 and 2 and a tension force is applied to the toothed belt 8, the belt land portion 10 is brought into contact with a pulley outside diameter portion. However, as shown in FIG. 10, in the same state as above, the belt land portion 10 may not come into contact with a pulley outside diameter portion. In such a case, θP, which is the maximum pressure angle at where the tooth top arc portion 4 and the tooth groove flank surface portion 5 in the pulley tooth groove portion 3 are connected together, may be set at θP=15 degrees to 25 degrees (see FIG. 2). The maximum pressure angle θP may be set at θP=16 degrees to 23 degrees, more preferably, θP=17 degrees to 22 degrees.

In a toothed belt power transmission apparatus in which, as described above, the land portion 10 of the toothed belt 8 does not come into contact with the outside diameter portions of the pulleys 1 and 2, areas of the belt land portion 10, the tooth root portion, and the flank surface portion that lie outside beyond the pulley outside diameter portions will not have any direct influence on the behaviors of the belt tooth portion 11 at the time of meshing. Therefore, not the maximum pressure angle θB of the belt tooth portion 11 in the toothed belt 8 alone, but the maximum pressure angle θP at where the tooth top arc portion 4 and the tooth groove flank surface portion 5 in the pulley tooth groove portion 3 are connected together, is set at θP=15 degrees to 25 degrees, which makes it possible to reduce the nonuniformity of velocity of the toothed belt 8 to the same extent as the above.

In such a case, the land portion 10 of the toothed belt 8 may be formed of a circularly arcuate surface. However, it is preferable that the belt land portion 10 be formed of an approximately flat surface which is contiguously interconnected with the flank surfaces of the belt tooth portion 11 flank by the tooth root portions 12 formed of circularly arcuate surfaces arranged symmetrically with each other in respect to the tooth width direction centerline C2. In the toothed belt 8 having the belt main body 9 made of polyurethane, when the pitch of the belt tooth portion 11 is not more than 1.5 mm, the dimensions of a concave portion formed to keep a core cord away from the belt land portion 10 are small and die processing is therefore difficult. For this reason, the core cord is arranged directly over the belt land portion 10 without the provision of such a concave portion. In order to prevent the core cord from getting damaged by contact with the outside diameter portions of the pulleys 1 and 2, it is designed such that the land portion 10 of the toothed belt 8 is made out of contact with the outside diameter portions of the pulleys 1 and 2. Accordingly, as described above, the arrangement that the land portion 10 of the toothed belt 8 is formed of an approximately flat surface is able to make the position of the core cord stable.

Further, the tooth groove bottom portion 6 of the tooth groove portion 3 of each of the pulleys 1 and 2 may be formed of an approximately flat surface. As a result of such arrangement, when the toothed belt 8 is wound around the pulleys 1 and 2, it is possible to make the tooth tip end portion 17 of the belt tooth portion 11 receivable by the tooth groove bottom portion 6 formed of an approximately flat surface having a large area. As a result, the core cord position (i.e., the pitch line PL) of the toothed belt 8 when wound around the pulleys 1 and 2 can be made stable, therefore reducing the nonuniformity of velocity of the toothed belt 8 to a further extent.

Further, in the construction of either the second or third embodiment, the following arrangement may be made. That is, in a power transmission state in which the toothed belt 8 is wound around the pulleys 1 and 2 and a tension force is applied to the toothed belt, the belt land portion 10 does not come into contact with a pulley outside diameter portion and the maximum pressure angle θP at where the tooth top arc portion 4 and the tooth groove flank surface portion 5 in the pulley tooth groove portion 3 are connected together, is set at θP=15 degrees to 25 degrees (either at θP=16 degrees to 23 degrees or at θP=17 degrees to 22 degrees).

Each of the foregoing embodiments of the present invention has been described in terms of the toothed belt 8 and the power transmission apparatus A incorporated in equipment for business use such as printers and photocopiers. However, the present invention is of course applicable to toothed belts and power transmission apparatus incorporated into machines other than business equipment.

Next, examples of the embodiments of the present invention will be described. In the first place, the nonuniformity of toothed belt velocity was analyzed using an FEM analytical method. In the FEM analytical method, two-dimensional dynamic analysis was carried out using a general-purpose software program ABAQUS. An analysis model was derived by modeling of two different pulleys and an endless belt having tooth portions in the inside thereof, wherein after application of tension force to the belt the pulleys were rotated. The profile of a belt tooth portion and the profile of a pulley tooth groove portion were formed in accordance with the foregoing embodiments. Each belt material constant was input by actual measurements for belts having a tooth pitch of 2.117 mm and respective constitutional materials (it was considered that the material constant did not vary even when the tooth profile varied). The belt main body was set as a quadrangular plane element and the core cord was set as a beam element, and in consideration of friction, the surface that was brought into contact with the pulleys was set as an interface element. A model of the pulley surface was a rigid surface.

The velocity of a specific point on the belt pitch line was output to obtain data on the nonuniformity of belt velocity.

Figure 11A:
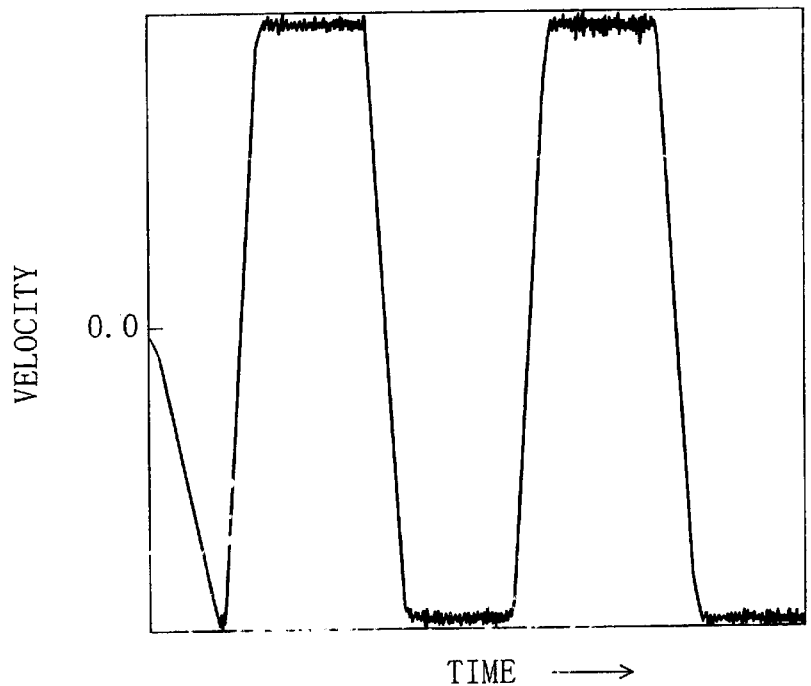
FIGS. 11(a) and 11(b) show the data derived from analysis on the nonuniformity of belt velocity analysis by an FEM analytical method.

The data thus obtained is shown in FIG. 11. FIG. 11(a) shows the data for an example of the present invention (which is equivalent to the first embodiment of the present invention) in which the belt tooth portion comprises tooth tip portions which are arranged symmetrically with each other in relation to the tooth width direction centerline and a tooth crest surface which is formed of an approximately flat surface for interconnecting the tooth tip portions and the maximum pressure angle is between 15 degrees and 25 degrees.

Figure 11B:
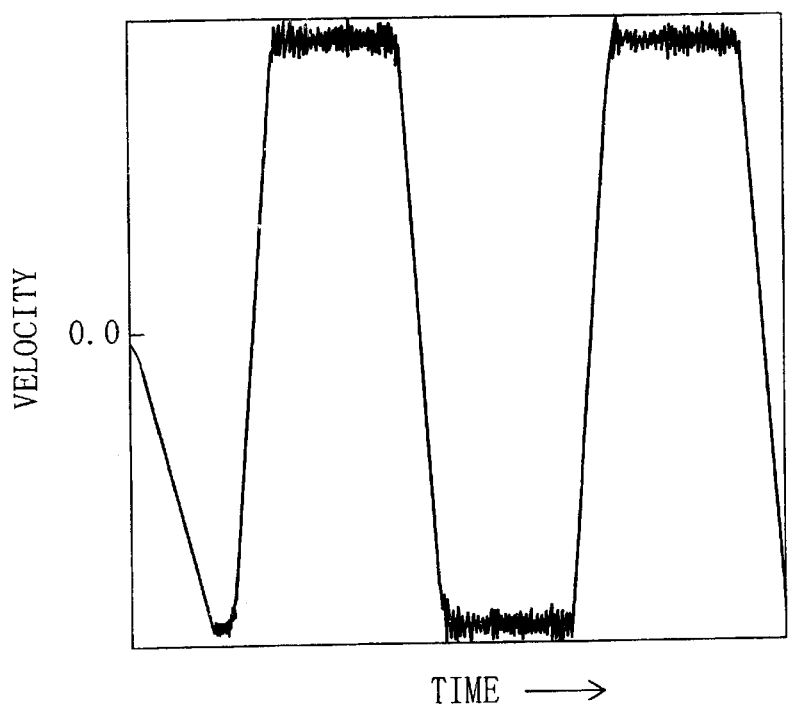

On the other hand, FIG. 11(b) shows the data for an example of a conventional technique in which the maximum pressure angle is 14.4 degrees.

Figure 12:
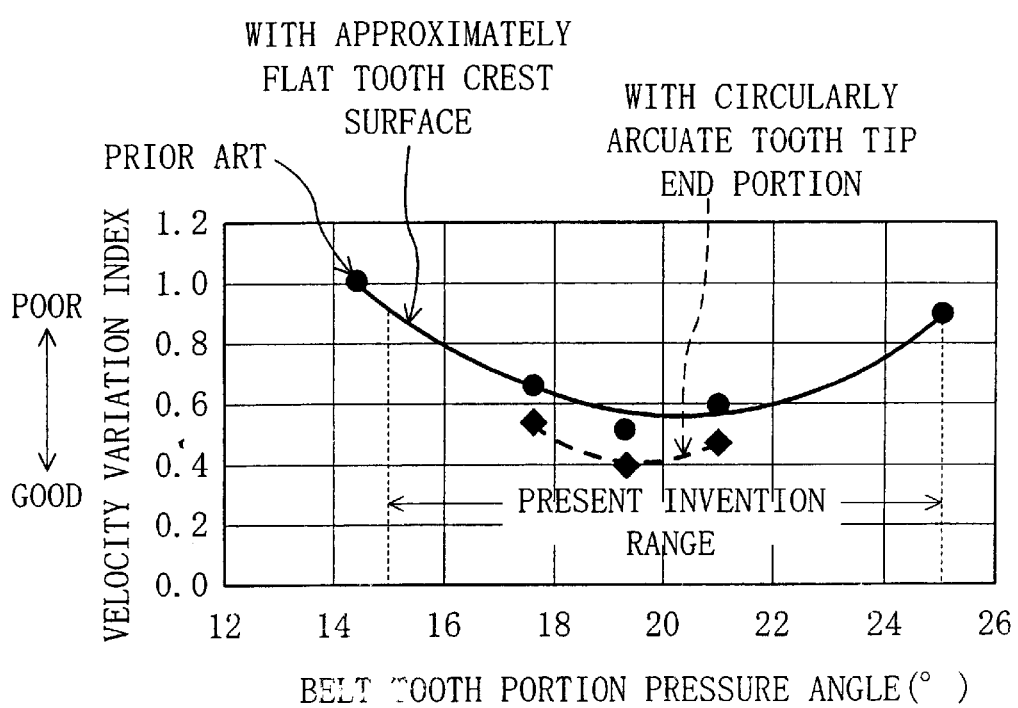
FIG. 12 shows a relationship between the belt tooth pressure angle and the belt velocity nonuniformity derived from the belt velocity nonuniformity analysis data.

Further, the relationship between the pressure angle of the belt tooth portion and the belt velocity nonuniformity (the belt velocity variation value) was found from the data and the results are shown in FIG. 12. In FIG. 12, the belt velocity variation value is represented by an index indicating that the conventional technique example is 1.0. Moreover, in FIG. 12 the solid line indicates the data for a belt tooth portion having a tooth profile comprising tooth tip portions and a tooth crest surface formed of an approximately flat surface wherein the present invention example covers a maximum pressure range between 15 degrees and 25 degrees. On the other hand, the broken line indicates the data for a belt tooth portion having a tooth tip end portion formed of a circularly arcuate surface having its center point on the tooth width direction centerline for interconnecting the power transmission portions, which is equivalent to the second embodiment of the present invention.

Figure 17:
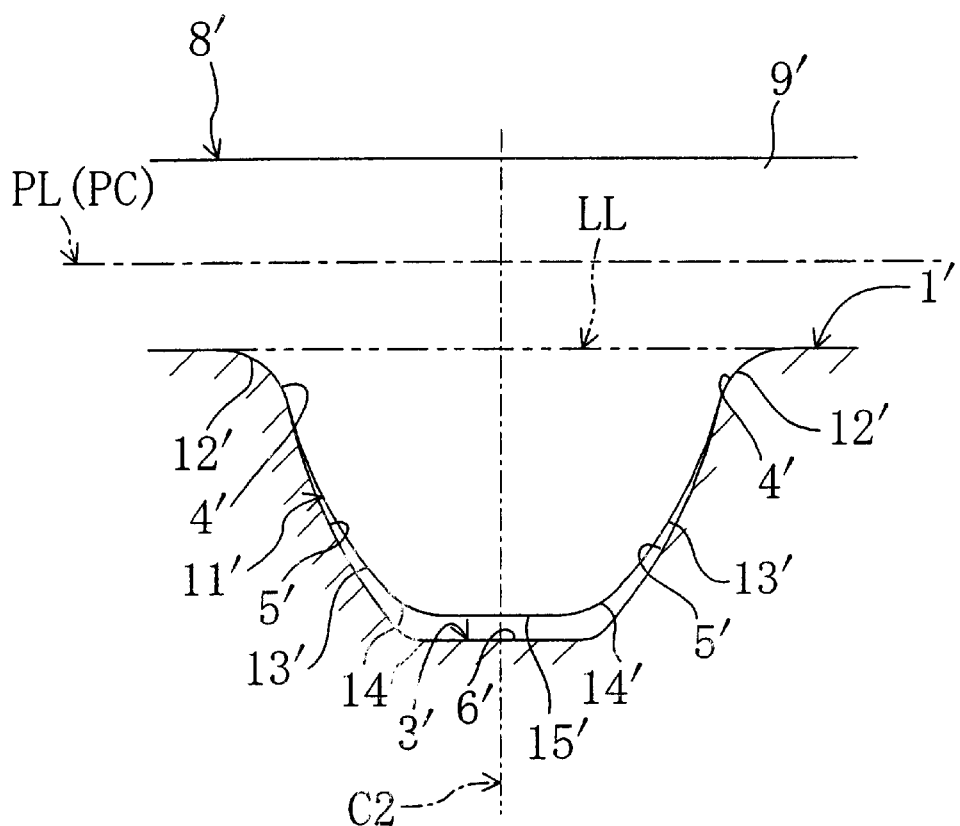
FIG. 17 corresponds to FIG. 2, showing a state when a tooth portion of a conventional toothed belt is in meshing engagement with a toothed pulley.

A power transmission apparatus made up of a belt and pulleys was prepared for performing a bench test by a measurement system to measure the nonuniformity of velocity of the belt. More specifically, as examples of the present invention, two toothed belts (Examples 1 and 2 of the present invention) having the same construction (i.e., the construction according to the second embodiment shown in FIG. 6) but having different maximum pressure angles (an angle of 17.6 degrees for one and an angle of 19.3 degrees for the other). On the other hand, as an example of the conventional technique, a toothed belt having a construction shown in FIG. 17 (the maximum pressure angle: 14.4 degrees) was prepared. The following table shows the dimensions of these toothed belts. Their dimension values are represented by an index which indicates that the belt tooth pitch (2.117 mm) is 1.0.

TABLE

| DIMENSIONS | PRESENT INVENTION | | PRIOR ART |
| --- | --- | --- | --- |
| | EX. 1 | EX. 2 | |
| BELT THICKNESS | 0.62 | ← | ← |
| BELT BODY THICKNESS | 0.26 | ← | ← |
| TOOTH HEIGHT | 0.36 | ← | ← |
| TOOTH PITCH | 1.0 | ← | ← |
| TOOTH WIDTH W | 0.61 | ← | ← |
| RADIUS r1B | 0.09 | ← | ← |
| RADIUS RB | 0.61 | 0.63 | 0.61 |
| PITCH LINE HEIGHT | 0.12 | ← | ← |
| DISTANCE a | 0.12 | 0.14 | 0.08 |
| DISTANCE b | W/2 | ← | ← |
| RADIUS rTB | 0.20 | 0.18 | — |

More concretely, the test toothed belts are made of rubber and has tooth portions of circularly arcuate profile (tooth pitch: 2.117 mm). The rubber is chloroprene rubber having a hardness of 70 degrees. The core cord is made from glass fiber of a diameter of 0.3 mm. The fabric, made from polyamide woolie finish yarn, is RF processed and only its rear side is processed by rubber cement.

Figure 13:
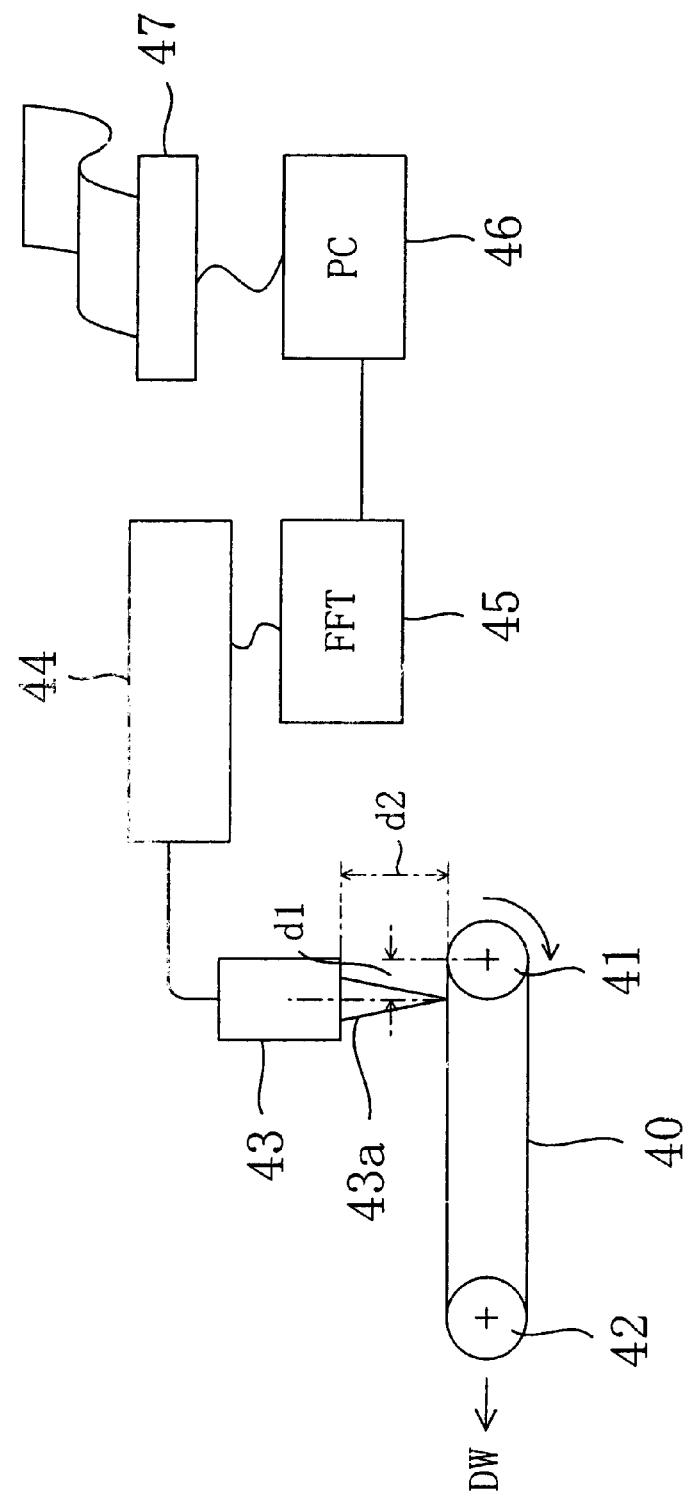
FIG. 13 shows a system for belt velocity nonuniformity measurement.
Figure 14:
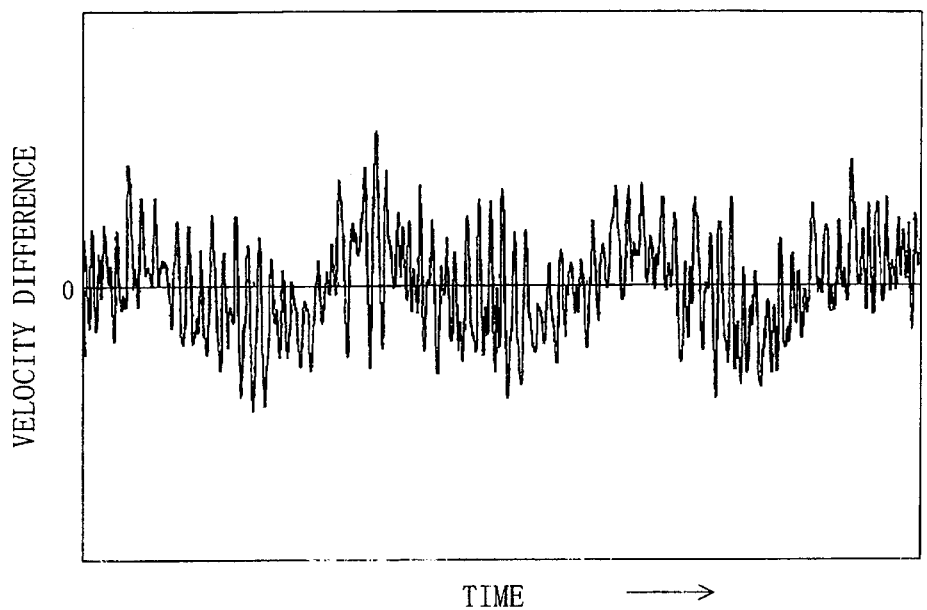
FIG. 14 shows the measurement data by the belt velocity nonuniformity measurement system.
Figure 15:
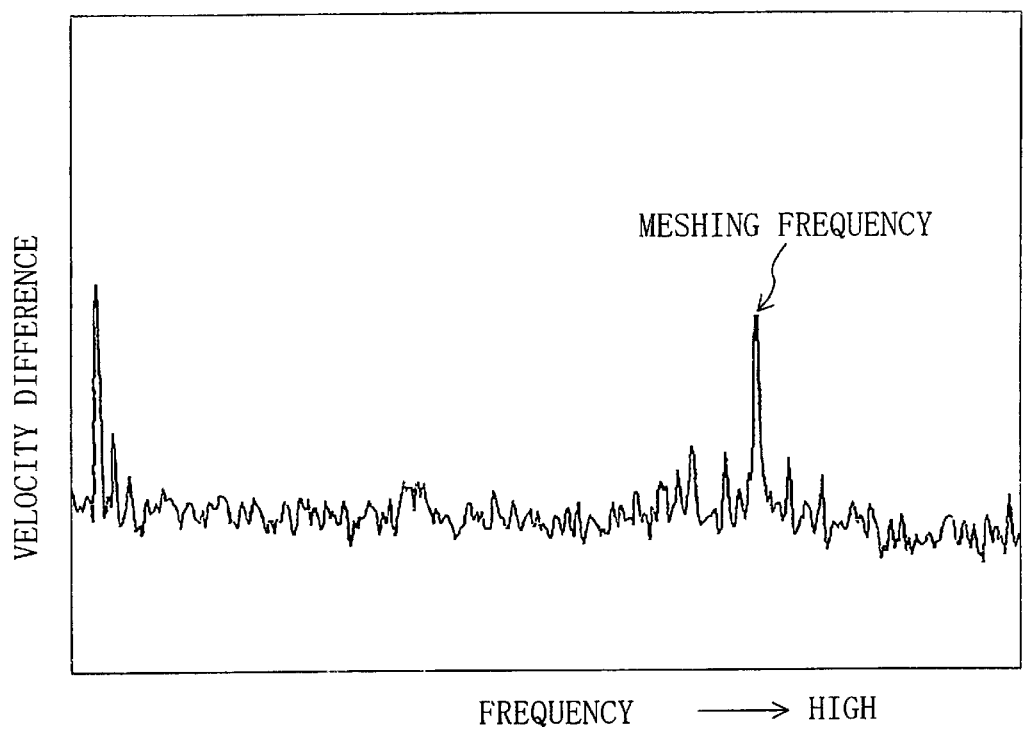
FIG. 15 shows the data derived from belt velocity nonuniformity frequency analysis.
Figure 16:
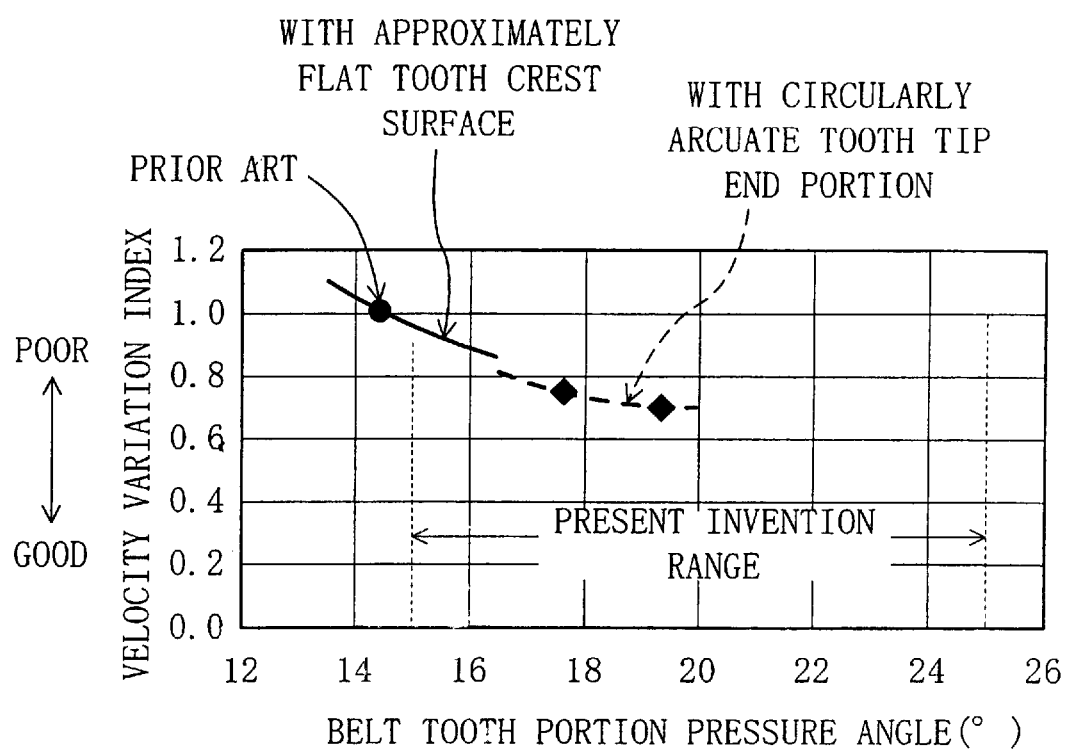
FIG. 16 shows a relationship between the belt tooth pressure angle and the belt velocity nonuniformity derived from the belt velocity nonuniformity measurement data.

These toothed belts were actually run to measure their velocity nonuniformity by a belt velocity nonuniformity measurement system of FIG. 13. The measurement system comprises a driving and driven pulleys 41 and 42 which are implemented by toothed pulleys around which each test toothed belt 40 is wound. Belt tension is applied by a static load DW to the driven pulley 42 and the driving pulley 41 is rotated in a direction indicated by an arrow in the figure with the driven pulley 42 placed in the noload state. A belt area in the slack side span of the belt 40 at a distance of d1=10 mm from the shaft center of the driving pulley 41, is illuminated with a laser light 43a from a probe 43 that is located a distance of d2=100±2 mm away from the area in respect to the belt lateral side. Based on the output signal from the probe 43, the nonuniformity of velocity of the belt 40 is measured by the velocity nonuniformity measurement device 44. The frequency of the velocity nonuniformity thus measured is analyzed by an FFT 45 and the analysis results are fed into a personal computer 46 and then printed out by a printer 47. The data measured by the velocity nonuniformity measurement system is shown in FIG. 14, while the data derived from analysis of the frequency of the belt velocity nonuniformity is shown in FIG. 15. A relationship between the pressure angle of the belt tooth portion and the velocity nonuniformity derived from the belt velocity nonuniformity measurement data is shown in FIG. 16. Note that each belt velocity variation value is an index value in which the conventional technique example (whose maximum pressure angle is 14.4 degrees) is 1.0.

As can be seen from FIG. 12, if the maximum pressure angle at where the power transmission portion of the belt tooth flank surface and the tooth root portion are connected together is between an angle of 15 degrees and an angle of 25 degrees, this reduces the nonuniformity of belt velocity to a further extent in comparison with the conventional technique example whose maximum pressure angle is 14.4 degrees. It is preferable that the maximum pressure angle be between 16 degrees and 23 degrees. Further, if the maximum pressure angle is set to fall within the range between 17 degrees and 22 degrees, this achieves a considerable reduction in the nonuniformity of belt velocity. It is optimally preferable that the maximum pressure angle be 19.3 degrees.

INDUSTRIAL APPLICABILITY

In accordance with the present invention, at the time when a belt tooth portion is about to come into meshing engagement with a pulley tooth groove portion, it is designed such that the contacting of a flank surface of the belt tooth portion with a flank surface of the pulley tooth groove portion is delayed and, in addition, a vertical component of a reaction force produced when the belt tooth portion slides into the pulley tooth groove portion is reduced. This allows the belt tooth portion to smoothly slide into pulley tooth groove portion, thereby considerably reducing the nonuniformity of velocity of the toothed belt to provide practically excellent advantages such as improvement in the printing accuracy and image quality of business use equipment such as a printer. Because of the capability of promotion of the improvement in the performance of business use equipment, the industrial applicability of the present invention is high.

What is claimed is:

1. A toothed belt comprising:
   a belt main body with a pitch line on which a tensile member is embedded therein;
   a plurality of belt tooth portions provided at a fixed pitch on a land line of said belt main body;
   each of said belt tooth portions comprising:
      tooth root portions formed of circularly arcuate surfaces which are arranged symmetrically with each other in respect to a centerline in the tooth width direction;
      power transmission portions formed of circularly arcuate surfaces of convex profile which contiguously adjoin said tooth root portions at a point, and lie at flank surfaces of said tooth portion, and are arranged symmetrically with each other in respect to said tooth width direction centerline;
      tooth tip portions formed of circularly arcuate surfaces which contiguously adjoin said power transmission portions and are arranged symmetrically with each other in respect to said tooth width direction centerline;
      a tooth crest surface formed of an approximately flat surface which interconnects with tooth tip portions;
      wherein a maximum pressure angle at said point where said power transmission portion of said belt tooth flank surface and said arcuate surfaces of said tooth root portion are connected together is between an angle of 15 degrees and an angle of 25 degrees.

2. The toothed belt of claim 1 wherein the maximum pressure angle at said point where said power transmission portion of said belt tooth flank surface and said tooth root portion are connected together is between an angle of 16 degrees and an angle of 23 degrees.

3. The toothed belt of claim 1 wherein the maximum pressure angle at said point where said power transmission portion of said belt tooth flank surface and said tooth root portion are connected together is between an angle of 17 degrees and an angle of 22 degrees.

4. A toothed belt power transmission apparatus comprising a combination of a toothed belt of any one of claims 1–3 and toothed pulleys each having a plurality of pulley tooth groove portions which are provided at a fixed pitch on a pulley outside diameter line,
   each of said pulley tooth groove portions comprising:
      tooth top arc portions formed of circularly arcuate surfaces which are arranged symmetrically with each other in respect to a centerline in the tooth groove width direction;
      tooth groove flank surface portions formed of circularly arcuate surfaces of concave profile which contiguously adjoin said tooth top arc portions and are arranged symmetrically with each other in respect to said tooth groove width direction centerline;
      a tooth groove bottom portion provided so as to interconnect said tooth groove flank surface portions;
   wherein:
      said belt tooth portion has flank surfaces whose profile is substantially the same as that of flank surfaces of said pulley tooth groove portion;
      in a power transmission state in which said toothed belt is wound around said toothed pulleys and a tension force is applied to said toothed belt, the maximum pressure angles of said belt tooth portion flank surface of said pulley tooth groove portion flank surface at their respective locations in the tooth height direction are made approximately equal to each other and a belt land portion comes into contact with a pulley outside diameter portion.

5. The toothed belt power transmission apparatus of claim 4, wherein said pulley tooth groove portion of each of said toothed pulleys has a tooth groove bottom portion formed of an approximately flat surface.

6. A toothed belt comprising:
a belt main body with a pitch line on which a tensile member is embedded therein;
a plurality of belt tooth portions provided at a fixed pitch on a land line of said belt main body;
each of said belt tooth portions comprising:
tooth root portions formed of circularly arcuate surfaces which are arranged symmetrically with each other in respect to a centerline in the tooth width direction;
power transmission portions formed of circularly arcuate surfaces of convex profile which contiguously adjoin said tooth root portions at a point, and lie at flank surfaces of said tooth portion, and are arranged symmetrically with each other in respect to said tooth width direction centerline;
a tooth tip end portion formed of a circularly arcuate surface which is so provided as to interconnect said power transmission portions and whose center point lies on said tooth width direction centerline;
wherein a maximum pressure angle at said point where said power transmission portion of said belt tooth flank surface and said arcuate surfaces of said tooth root portion are connected together is between an angle of 15 degrees and an angle of 25 degrees.

7. The toothed belt of claim 6 wherein the maximum pressure angle at said point where said power transmission portion of said belt tooth flank surface and said tooth root portion are connected together is between an angle of 16 degrees and an angle of 23 degrees.

8. The toothed belt of claim 6 wherein the maximum pressure angle at said point where said power transmission portion of said belt tooth flank surface and said tooth root portion are connected together is between an angle of 17 degrees and an angle of 22 degrees.

9. A toothed belt power transmission apparatus comprising a combination of a toothed belt of any one of claims 6–8 and toothed pulleys each having a plurality of pulley tooth groove portions which are provided at a fixed pitch on a pulley outside diameter line,
each of said pulley tooth groove portions comprising:
tooth top arc portions formed of circularly arcuate surfaces which are arranged symmetrically with each other in respect to a centerline in the tooth groove width direction;
tooth groove flank surface portions formed of circularly arcuate surfaces of concave profile which contiguously adjoin said tooth top arc portions and are arranged symmetrically with each other in respect to said tooth groove width direction centerline;
a tooth groove bottom portion provided so as to interconnect said tooth groove flank surface portions;
wherein:
said belt tooth portion has flank surfaces whose profile is- substantially the same as that of flank surfaces of said pulley tooth groove portion;
in a power transmission state in which said toothed belt is wound around said toothed pulleys and a tension force is applied to said toothed belt, the maximum pressure angles of said belt tooth portion flank surface and said pulley tooth groove portion flank surface at their respective locations in the tooth height direction are made approximately equal to each other and a belt land portion comes into contact with a pulley outside diameter portion.

10. The toothed belt power transmission apparatus of claim 9, wherein said pulley tooth groove portion of each of said toothed pulleys has a tooth groove bottom portion which comprises a circularly arcuate surface inscribing an arc of a circle whose center point lies on said tooth groove width direction centerline and whose radius is greater than that of said tooth tip end portion of said belt tooth portion.

11. A toothed belt power transmission apparatus comprising a combination of a toothed belt and toothed pulleys,
(a) said toothed belt having:
a belt main body with a pitch line on which a tensile member is embedded therein;
a plurality of belt tooth portions provided at a fixed pitch in said belt main body;
a land portion provided between adjacent belt tooth portions;
(b) each of said belt tooth portions having:
power transmission portions formed of circularly arcuate surfaces of convex profile which lie at flank surfaces of said tooth portion and are arranged symmetrically with each other in respect to a centerline in the tooth width direction;
tooth tip portions formed of circularly arcuate surfaces which contiguously adjoin said power transmission portions and are arranged symmetrically with each other in respect to said tooth width direction centerline;
a tooth crest surface formed of an approximately flat surface which is so provided as to interconnect said tooth tip portions;
(c) each of said toothed pulleys having:
a plurality of pulley tooth groove portions provided at a fixed pitch on a pulley outside diameter line;
(d) each of said pulley tooth groove portions having:
tooth top arc portions formed of circularly arcuate surfaces which are arranged symmetrically with each other in respect to a centerline in the tooth groove width direction;
tooth groove flank surface portions formed of circularly arcuate surfaces of concave profile which contiguously adjoin said tooth top arc portions and are arranged symmetrically with each other in respect to said tooth groove width direction centerline;
a tooth groove bottom portion provided so as to interconnect said tooth groove flank surface portions at a point;
wherein:
a maximum pressure angle at said point where said tooth top arc portion and said tooth groove flank surface portion in said pulley tooth groove portion are connected together is between an angle of 15 degrees and an angle of 25 degrees;
said belt tooth portion has flank surfaces whose profile is substantially the same as that of flank surfaces of said pulley tooth groove portion;
in a power transmission state in which said toothed belt is wound around said toothed pulleys and a tension force is applied to said toothed belt, the pressure angles of said belt tooth portion flank surface and said pulley tooth groove portion flank surface at their respective locations in the tooth height direction are made approximately equal to each other and a belt land portion does not come into contact with the pulley outside diameter portion.

12. The toothed belt power transmission apparatus of claim 11, wherein said land portion of said toothed belt comprises an approximately flat surface which is contiguously interconnected with said belt tooth portion flank surfaces by tooth root portions formed of circularly arcuate surfaces which are arranged symmetrically with said tooth width direction centerline.

13. The toothed belt power transmission apparatus of claim 11 or claim 12, wherein the maximum pressure angle at where said tooth top arc portion and said tooth groove flank surface portion in said pulley tooth groove portion are connected together is between an angle of 16 degrees and an angle of 23 degrees.

14. The toothed belt power transmission apparatus of claim 11 or claim 12, wherein the maximum pressure angle at where said tooth top arc portion and said tooth groove flank surface portion in said pulley tooth groove portion are connected together is between an angle of 17 degrees and an angle of 22 degrees.

15. The toothed belt power transmission apparatus of claim 11, wherein said pulley tooth groove portion of each of said toothed pulleys has a tooth groove bottom portion which is formed of an approximately flat surface.

16. A toothed belt power transmission apparatus comprising a combination of a toothed belt and toothed pulleys,
- (a) said toothed belt having:
  - a belt main body with a pitch line on which a tensile member is embedded therein;
  - a plurality of belt tooth portions provided at a fixed pitch in said belt main body;
  - a land portion provided between adjacent belt tooth portions;
- (b) each of said belt tooth portions having:
  - power transmission portions formed of circularly arcuate surfaces of convex profile which lie at flank surfaces of said tooth portion and are arranged symmetrically with each other in respect to a centerline in the tooth width direction;
  - a tooth tip end portion formed of a circularly arcuate surface which is so provided as to interconnect said power transmission portions and whose center point lies on said tooth width direction centerline;
- (c) each of said toothed pulleys having:
  - a plurality of pulley tooth groove portions provided at a fixed pitch on a pulley outside diameter line;
- (d) each of said pulley tooth groove portions having:
  - tooth top arc portions formed of circularly arcuate surfaces which are arranged symmetrically with each other in respect to a centerline in the tooth groove width direction;
  - tooth groove flank surface portions formed of circularly arcuate surfaces of concave profile which contiguously adjoin said tooth top arc portions at a point and are arranged symmetrically with each other in respect to said tooth groove width direction centerline;
  - a tooth groove bottom portion provided so as to interconnect said tooth groove flank surface portions;

wherein:
- a maximum pressure angle at said point where said tooth top arc portion and said tooth groove flank surface portion in said pulley tooth groove portion are connected together is between an angle of 15 degrees and an angle of 25 degrees;
- said belt tooth portion has flank surfaces whose profile is substantially the same as that of flank surfaces of said pulley tooth groove portion;
- in a power transmission state in which said toothed belt is wound around said toothed pulleys and a tension force is applied to said toothed belt, the pressure angles of said belt tooth portion flank surface and said pulley tooth groove portion flank surface at their respective locations in the tooth height direction are made approximately equal to each other and a belt land portion does not come into contact with the pulley outside diameter portion.

17. The toothed belt power transmission apparatus of claim 16, wherein said land portion of said toothed belt comprises an approximately flat surface which is contiguously interconnected with said belt tooth portion flank surfaces by tooth root portions formed of circularly arcuate surfaces which are arranged symmetrically with said tooth width direction centerline.

18. The toothed belt power transmission apparatus of claim 16 or claim 17, wherein the maximum pressure angle at said point where said tooth top arc portion and said tooth groove flank surface portion in said pulley tooth groove portion are connected together is between an angle of 16 degrees and an angle of 23 degrees.

19. The toothed belt power transmission apparatus of claim 16 or claim 17, wherein the maximum pressure angle at said point where said tooth top arc portion and said tooth groove flank surface portion in said pulley tooth groove portion are connected together is between an angle of 17 degrees and an angle of 22 degrees.

20. The toothed belt power transmission apparatus of claim 11, wherein said pulley tooth groove portion of each of said toothed pulleys has a tooth groove bottom portion which comprises a circularly arcuate surface inscribing an arc of a circle whose center point lies on said tooth groove width direction centerline and whose radius is greater than that of said tooth tip end portion of said belt tooth portion.

* * * * *

UNITED STATES PATENT AND TRADEMARK OFFICE
CERTIFICATE OF CORRECTION

PATENT NO.    : 6,485,384 B1                                Page 1 of 1
DATED         : November 26, 2002
INVENTOR(S)   : Masaki Ochiai et al.

It is certified that error appears in the above-identified patent and that said Letters Patent is hereby corrected as shown below:

<u>Title page,</u>
Item [73], Assignee, delete "Bando Chemical Industries, Inc." add
-- Bando Chemical Industries, Ltd. --.

Signed and Sealed this

Twenty-eighth Day of October, 2003

JAMES E. ROGAN
*Director of the United States Patent and Trademark Office*